(12) United States Patent
Zhang

(10) Patent No.: US 11,374,721 B2
(45) Date of Patent: Jun. 28, 2022

(54) METHOD AND DEVICE FOR WIRELESS COMMUNICATION

(71) Applicant: APEX BEAM TECHNOLOGIES LLC, Marshall, TX (US)

(72) Inventor: Xiaobo Zhang, Shanghai (CN)

(73) Assignee: APEX BEAM TECHNOLOGIES LLC, Marshall, TX (US)

(*) Notice: Subject to any disclaimer, the term of this patent is extended or adjusted under 35 U.S.C. 154(b) by 43 days.

(21) Appl. No.: 17/095,767

(22) Filed: Nov. 12, 2020

(65) Prior Publication Data
US 2021/0067305 A1 Mar. 4, 2021

Related U.S. Application Data

(63) Continuation of application No. 16/517,678, filed on Jul. 22, 2019, now Pat. No. 10,892,877, which is a
(Continued)

(51) Int. Cl.
| | |
|---|---|
| *H04W 4/00* | (2018.01) |
| *H04L 5/00* | (2006.01) |
| *H04W 72/04* | (2009.01) |
| *H04W 74/08* | (2009.01) |
| *H04W 88/06* | (2009.01) |
| *H04W 88/10* | (2009.01) |

(52) U.S. Cl.
CPC ....... *H04L 5/0082* (2013.01); *H04W 72/0446* (2013.01); *H04W 72/0453* (2013.01); *H04W 72/0493* (2013.01); *H04W 74/0833* (2013.01); *H04W 88/06* (2013.01); *H04W 88/10* (2013.01)

(58) Field of Classification Search
None
See application file for complete search history.

(56) References Cited

U.S. PATENT DOCUMENTS 10,892,877 B2 * 1/2021 Zhang ............ H04W 88/10
2015/0256308 A1 9/2015 Ma et al.
(Continued)

FOREIGN PATENT DOCUMENTS

| CN | 104219757 A | 12/2014 |
| CN | 104602350 A | 5/2015 |
| CN | 104683969 A | 6/2015 |

OTHER PUBLICATIONS

ISR in applicant No. PCT/CN2017/072131 dated Sep. 27, 2017.

*Primary Examiner* — Phirin Sam
(74) *Attorney, Agent, or Firm* — Zhong Law, LLC

(57) ABSTRACT

A user equipment transmits a first wireless signal and transmits a second wireless signal; the first wireless signal is generated by a first sequence; the first wireless signal is used to determine a first time interval; the first time interval is a time interval between a first and a second time instant; the first time instant is a starting time instant at which a transmitter of the first wireless signal transmits the first wireless signal; the second time instant is a starting time instant at which a transmitter of the second wireless signal transmits the second wireless signal; the first time instant is earlier than the second time instant; the second wireless signal occupies a first wireless resource; the first wireless resource is one of J candidate wireless resources; the first time interval is used to determine the first wireless resource out of the J candidate wireless resources.

20 Claims, 10 Drawing Sheets

Related U.S. Application Data continuation of application No. PCT/CN2017/072131, filed on Jan. 22, 2017.

(56) References Cited

U.S. PATENT DOCUMENTS

| | | | |
|---|---|---|---|
| 2016/0373915 A1* | 12/2016 | Kim | H04W 76/14 |
| 2018/0020449 A1* | 1/2018 | Lee | H04W 72/0446 |
| 2018/0124836 A1* | 5/2018 | Hong | H04W 74/0833 |
| 2018/0146402 A1* | 5/2018 | Seo | H04W 40/12 |
| 2018/0176973 A1* | 6/2018 | Kim | H04W 72/04 |
| 2020/0145079 A1* | 5/2020 | Marinier | H04W 52/42 |

* cited by examiner

METHOD AND DEVICE FOR WIRELESS COMMUNICATION

CROSS-REFERENCE TO RELATED APPLICATION

This application is a continuation application of U.S. application Ser. No. 16/517,678, filed Jul. 22, 2019, which is a continuation of International Application No. PCT/CN2017/072131, filed Jan. 22, 2017, the full disclosure of which is incorporated herein by reference.

BACKGROUND

Technical Field

The present disclosure relates to a transmission scheme in a wireless communication system, and in particular to a method and device related to uplink transmission.

Related Art

The application scenarios of future wireless communication systems are increasingly diversified, and different application scenarios impose different performance requirements on the system. In order to meet the different performance requirements of various application scenarios, Wireless Access Network (RAN) #72 plenary meeting of the 3rd Generation Partner Project (3GPP) decided to conduct a search for the new air interface technology (New Wireless, NR).

In existing cellular wireless communication systems (such as Long Term Evolution (LTE)), uplink and downlink data transmissions are based on central scheduling. That is, the wireless resources occupied by the downlink transmission from each base station to a user equipment (UE) and the modulation and coding schemes are allocated by the base station. The wireless resources occupied by the uplink transmission from each user equipment to the base station and the modulation and coding schemes are also pre-allocated by the base station. These uplink and downlink scheduling information is carried in Downlink Control Information (DCI). The uplink and downlink transmission modes by way of allocating resources through the center (base station) may be collectively referred to as Grant-based uplink and downlink transmission.

In the next generation of wireless cellular networks (such as 5G NR, further evolution of LTE, further evolution of Narrow Band Internet of Things (NB-IoT)), the data transmission that only supports Grant-based transmission is unable to meet the increasingly diverse needs of the application. Especially for uplink transmission, in the scenario with high requirement for low latency or capacity, for example, Ultra Reliable Low Latency Communication (URLLC) has very strict delay requirements, Machine Type Communication (mMTC) or NB-IoT, or the application scenario of enhanced Machine Type Communication (eMTC) has high requirement for the system capacity, the grant-based approach cannot meet the requirements of the scenario due to the scheduling delay and the limitation of the overhead of the transmission-initiated overhead. Therefore, in contrast to the grant-based approach, uplink transmissions can be completed by a Grant-free manner. The Grant-free uplink transmissions does not require the wireless resources occupied by the transmission and/or modulation and coding scheme dynamically allocated by the base station before starting the uplink transmission. Therefore, this reduces the overhead required for transmission and for initiating transmissions.

SUMMARY

In the process of Grant-free uplink transmission, collision may occur due to lack of centralized dynamic scheduling and resource coordination. When a Grant-free uplink transmission also includes a preamble transmission, the transmission of the preamble may also collide. However, since the preamble is generally generated by sequences having a very low correlation with each other, even if a collision occurs, as long as the time at which the preamble arrives at the receiver is different, the receiver can still distinguish the transmission of the different user equipment from the preamble. If the associated Grant-free data transmission still collides, eventually it may result in the uplink transmission not being successfully received and decoded.

On the other hand, even if the Grant-free uplink transmission does not include the preamble transmission, when there are multiple receivers (such as multiple TRPs), it is likely that the uplink transmission may be received by a non-target receiver, resulting in link performance degradation or false alarms, or also increasing the complexity of the receiver.

The present disclosure provides a solution to the above-described problem of performance degradation due to collisions in the Grant-free uplink transmission. The solution achieves the purpose of reducing collision and/or reducing receiver complexity by distinguishing uplink synchronization time for the wireless resources of the uplink transmission. It should be noted that, in the case of no conflict, the embodiments in the user equipment (UE) and the features in the embodiments of the present disclosure can be applied to the base station, and vice versa. Further, in case of no conflicts, the embodiments of the present disclosure and the features of the embodiments may be arbitrarily combined with each other.

The present disclosure provides method for wireless communication in a user equipment (UE), comprising:
- transmitting a first wireless signal; and
- transmitting a second wireless signal;

wherein the first wireless signal is generated by a first sequence; the first wireless signal is used to determine a first time interval; the first time interval is a time interval between a first time instant and a second time instant; the first time instant is a starting time instant at which a transmitter of the first wireless signal transmits the first wireless signal; the second time instant is a starting time instant at which a transmitter of the second wireless signal transmits the second wireless signal; the first time instant is earlier than the second time instant; the second wireless signal occupies a first wireless resource; the first wireless resource is one of J candidate wireless resources; the J is a positive integer; the first time interval is used to determine the first wireless resource out of the J candidate wireless resources.

In one embodiment of the method for wireless communication in a user equipment, the first wireless resource in the J candidate wireless resource(s) is determined based on the first time interval (or TA value) such that the uplink transmission in different uplink synchronization time range may use different wireless resources. Therefore, the possibility of collision of the second wireless signals can be reduced in the case where the first wireless signal collides, and system performance can be improved.

In one embodiment, distinguishing different wireless resources for the second wireless signal by using the uplink synchronization time range may ensure that the second wireless signal is received by a target receiver, thereby improving link performance and reducing false alarm probability.

In one embodiment, the first sequence is a Zadoff-Chu (ZC) sequence.

In one embodiment, the first sequence is part of a ZC sequence.

In one embodiment, the first sequence is a sequence that is extended based on a ZC sequence.

In one embodiment, the first sequence is a sequence obtained by transforming based on a ZC sequence.

In one embodiment, the first sequence is a pseudo-random sequence or the first sequence is part of a pseudo-random sequence.

In one embodiment, the first sequence is an m sequence.

In one embodiment, the first sequence is a sequence in which all elements are the same.

In one embodiment, the transmission channel corresponding to the first wireless signal is a Random Access Channel (RACH).

In one embodiment, the transmission channel corresponding to the first wireless signal is a Physical Random Access Channel (PRACH).

In one embodiment, the transmission channel corresponding to the first wireless signal is a Narrow band Physical Random Access Channel (NPRACH).

In one embodiment, the first wireless signal is a signal generated based on a preamble.

In one embodiment, the first wireless signal is used by a base station to determine the first time interval.

In one embodiment, the first wireless signal is used by a Transmission Reception Point (TRP) to determine the first time interval.

In one embodiment, the first time interval is determined by a base station performing correlation on the first wireless signal.

In one embodiment, a transmission channel corresponding to the second wireless signal is an Uplink Shared Channel (UL-SCH).

In one embodiment, a physical channel corresponding to the second wireless signal is a Physical Uplink Shared Channel (PUSCH).

In one embodiment, a physical channel corresponding to the second wireless signal is a Narrow band Physical Uplink Shared Channel (NPUSCH).

In one embodiment, the second wireless signal carries Scheduling Request (SR) information.

In one embodiment, the first time interval is a positive number.

In one embodiment, the first time interval is a negative number.

In one embodiment, the unit of the first time interval is microsecond.

In one embodiment, the first time interval is represented by the number of unit time intervals.

In one embodiment, the first time interval comprises a difference between a positive integer number of Orthogonal Frequency Division Multiplexing (OFDM) symbols and a Timing Advance (TA).

In one embodiment, the receiver of the first wireless signal and the receiver of the second wireless signal are the same.

In one embodiment, the receiver of the first wireless signal and the receiver of the second wireless signal are different.

In one embodiment, the first wireless resource comprises at least one of time domain resource, frequency domain resource, code domain resource, and airspace resource.

In one embodiment, any two candidate wireless resources of the J candidate wireless resources are orthogonal, meaning that no resource element belongs to two wireless resources at the same time. The resource element is the smallest component of the wireless resource.

In one embodiment, any two candidate wireless resources of the J candidate wireless resources are orthogonal, meaning that no RU belongs to two wireless resources at the same time. The wireless resource refers to a time-frequency resource. The RU occupies one subcarrier in frequency domain, and the RU occupies one OFDM symbol in time domain.

In one embodiment, any two candidate wireless resources of the J candidate wireless resources are orthogonal, meaning that no code is used for two wireless resources at the same time. The wireless resource refers to a code domain resource.

In one embodiment, two candidate wireless resources of the J candidate wireless resources are non-orthogonal.

In one embodiment, the number of the resource elements in any two candidate wireless resources of the J candidate wireless resources is the same.

In one embodiment, the number of the resource elements in two candidate wireless resources of the J candidate wireless resources is different.

In one embodiment, the first time interval is used by the UE to determine the first wireless resource out of the J candidate wireless resources.

In one embodiment, the first time interval is used by a base station to determine the first wireless resource out of the J candidate wireless resources.

In one embodiment, the first time interval is used by the TRP to determine the first wireless resource out of the J candidate wireless resources.

In one embodiment, the first time interval determines the first wireless resource out of the J candidate wireless resources by using a pre-determined mapping relationship.

In one embodiment of the method for wireless communication in a user equipment, the J candidate wireless resource(s) correspond(s) to P time interval range(s); any two time interval ranges of the P time interval ranges do not overlap; the P is a positive integer; the first time interval belongs to a target time interval range; the target time interval range is a time interval range of the P time interval ranges; the target time interval range corresponds to K candidate wireless resource(s) out of the J candidate wireless resources; the first wireless resource is one of the K candidate wireless resource(s); the K is a positive integer smaller than or equal to the J.

In one embodiment, one time interval range refers to a continuous range of one time interval.

In one embodiment, the phrase that any two time interval ranges of the P time interval ranges do not overlap refers to no time interval belongs to two the time interval ranges.

In one embodiment, the J candidate wireless resources correspond to the P time interval ranges based on a pre-determined mapping relationship.

In one embodiment, two candidate wireless resources in the J candidate wireless resources correspond to one same time interval range of the P time interval ranges.

In one embodiment, any two candidate wireless resources in the J candidate wireless resources correspond to two different time interval ranges of the P time interval ranges.

In one embodiment, the J is equal to the P.

In one embodiment, the J is equal to the P, and the J candidate wireless resources are in one-to-one correspondence to the P time interval intervals.

In one embodiment, the interval lengths of any two time interval ranges of the P time interval ranges are the same.

In one embodiment, the interval lengths of two time interval ranges of the P time interval ranges are different.

In one embodiment, the P is equal to 2.

In one embodiment, the P is a positive integer greater than 2.

In one embodiment, the P is predefined.

In one embodiment, the P is configured through a network.

In one embodiment, the K is equal to 1.

In one embodiment, the K is a positive integer greater than 1.

In one embodiment, the method for wireless communication in a user equipment further comprises:

receiving a first signaling;

wherein the first wireless signaling is used to determine Q wireless resource pool(s); the Q is a positive integer; each candidate wireless resource of the J candidate wireless resources belongs to one of the Q wireless resource pool(s); the K candidate wireless resource(s) belongs (belong) to a first wireless resource pool the first wireless resource pool is one of the Q wireless resource pool(s); the first time interval is used to determine the first wireless resource pool out of the Q wireless resource pool(s).

In one embodiment, the wireless resource pool includes a positive integer number of Physical Resource Blocks (PRB) in frequency domain.

In one embodiment, the wireless resource pool includes a positive integer number of Resource Block Groups (RBG) in frequency domain.

In one embodiment, the number of the wireless resource elements in any two wireless resource pools of the Q wireless resource pools is the same.

In one embodiment, the number of the wireless resource elements in two wireless resource pools of the Q wireless resource pools is different.

In one embodiment, the J is greater than the Q.

In one embodiment, the J is less than the Q.

In one embodiment, the J is equal to the Q.

In one embodiment, the J is equal to the Q, and the J candidate wireless resources belong to the Q wireless resource pools.

In one embodiment, the J is equal to the Q, and the J candidate wireless resources belong to the Q wireless resource pools. The J candidate wireless resources are the Q wireless resource pools.

In one embodiment, the first wireless signaling is used by the UE to determine the Q wireless resource pool(s).

In one embodiment, the first wireless signaling explicitly indicates the Q wireless resource pool(s).

In one embodiment, the first wireless signaling implicitly indicates the Q wireless resource pool(s).

In one embodiment, the first wireless signaling includes default value(s) of the Q wireless resource pool(s).

In one embodiment, the first wireless signaling is a higher layer signaling.

In one embodiment, the first wireless signaling is a physical layer signaling.

In one embodiment, the first wireless signaling is a Wireless Resource Control (RRC) signaling.

In one embodiment, the first wireless signaling is Downlink Control Information (DCI).

In one embodiment, the K candidate wireless resource(s) belongs (belong) to a first wireless resource pool the first wireless resource pool is one wireless resource pool of the Q wireless resource pool(s); the first time interval is used to determine the first wireless resource pool in the Q wireless resource pool(s).

In one embodiment, the first time interval is used by the UE to determine the first resource pool in the Q wireless resource pool(s).

In one embodiment, the first time interval is used by the base station to determine the first resource pool in the Q wireless resource pool(s).

In one embodiment, the first time interval is used by the TRP to determine the first resource pool in the Q wireless resource pool(s).

In one embodiment, the K is equal to 1.

In one embodiment, the K is a positive integer greater than 1.

In one embodiment, the first time interval determines the first resource pool in the Q wireless resource pool(s) by using the specific mapping relationship.

In one embodiment, the method for wireless communication in a user equipment further comprises:

receiving a second wireless signaling;

wherein the second wireless signaling is used to determine the first time interval.

In one embodiment, the second wireless signaling indicates a portion of the first time interval.

In one embodiment, the first time interval is equal to a sum of a known time interval and an offset value. The offset value is positive; or the offset value is negative. The second wireless signaling indicates the offset value.

In one embodiment, the second wireless signaling explicitly indicates the first time interval.

In one embodiment, the second wireless signaling implicitly indicates the first time interval.

In one embodiment, the second wireless signaling includes a default value of the first time interval.

In one embodiment, the second wireless signaling is a high layer signaling.

In one embodiment, the second wireless signaling is a physical layer signaling.

In one embodiment, the second wireless signaling is a Medium Access Control (MAC) signaling.

In one embodiment, the second wireless signaling is a Wireless Resource Control (RRC) signaling.

In one embodiment, the second wireless signaling is a Downlink Control Information (DCI).

In one embodiment, the second wireless signaling is transmitted through a Downlink Shared Channel (DL-SCH).

In one embodiment of the method for wireless communication in a user equipment, the first wireless signal is used to determine whether the second wireless signal is transmitted or not.

In one embodiment, the first wireless signal is used by a Transmission Reception Point (TRP) to determine whether the second wireless signal is transmitted or not.

In one embodiment, the first wireless signal is used by a Transmission Reception Point (TRP) to determine whether the second wireless signal is transmitted or not.

In one embodiment, whether the second wireless signal is transmitted or not is determined by a base station performing correlation on the first wireless signal.

In one embodiment, when the associated peak of the first wireless signal after performing correlation exceeds a given threshold, the base station determines that the second wireless signal is transmitted.

In one embodiment of the method for wireless communication in a user equipment, the first sequence belongs to a target sequence set; the first wireless signal occupies a target time-frequency resource; at least one of an index of the first sequence in the target sequence set, a location of the target time-frequency resource in time domain, a location of the target time-frequency resource in frequency domain, or a correspondence relationship between the location of the target time-frequency resource in time domain and the location of the target time-frequency resource in frequency domain is used to determine the first wireless resource out of the J candidate wireless resources.

In one embodiment, the target sequence set only includes the first sequence.

In one embodiment, the target sequence set includes the first sequence and a sequence other than the first sequence.

In one embodiment, any one of the target sequence sets is a ZC sequence.

In one embodiment, the target time-frequency resource is continuous in time domain.

In one embodiment, the target time-frequency resource is discrete in time domain.

In one embodiment, the target time-frequency resource is continuous in frequency domain.

In one embodiment, the target time-frequency resource is discrete in frequency domain.

In one embodiment, the target time-frequency resource is packet hopping in frequency domain.

In one embodiment, the target time-frequency resource is two-stage packet hopping in frequency domain.

In one embodiment, the index of the first sequence in the target sequence set is an index for which the sequences in the target sequence set are sorted by a specific order.

In one embodiment, the location of the target time-frequency resource in time domain refers to a subframe number occupied by the target time-frequency resource.

In one embodiment, the location of the target time-frequency resource in time domain refers to a wireless frame number occupied by the target time-frequency resource.

In one embodiment, the location of the target time-frequency resource in time domain refers to a slot number occupied by the target time-frequency resource.

In one embodiment, the location of the target time-frequency resource in frequency domain refers to an index of a PRB occupied by the target time-frequency resource.

In one embodiment, the location of the target time-frequency resource in frequency domain refers to an absolute frequency of the target time-frequency resource.

In one embodiment, the corresponding relationship between the location of the target time-frequency resource in time domain and the location of the target time-frequency resource in frequency domain refers to a frequency hopping pattern in the target time-frequency resource.

In one embodiment, at least one of an index of the first sequence in the target sequence set, a location of the target time-frequency resource in time domain, a location of the target time-frequency resource in frequency domain, or a correspondence relationship between the location of the target time-frequency resource in time domain and the location of the target time-frequency resource in frequency domain is used by the UE to determine the first wireless resource out of the J candidate wireless resources.

In one embodiment, at least one of an index of the first sequence in the target sequence set, a location of the target time-frequency resource in time domain, a location of the target time-frequency resource in frequency domain, or a correspondence relationship between the location of the target time-frequency resource in time domain and the location of the target time-frequency resource in frequency domain is used by the base station to determine the first wireless resource out of the J candidate wireless resources.

In one embodiment, at least one of an index of the first sequence in the target sequence set, a location of the target time-frequency resource in time domain, a location of the target time-frequency resource in frequency domain, or a correspondence relationship between the location of the target time-frequency resource in time domain and the location of the target time-frequency resource in frequency domain is used to determine the first wireless resource out of the J candidate wireless resources through a pre-determined mapping relationship In one embodiment, the first wireless resource is determined by using the following formula in the J candidate wireless resources:

$$Iresource = (Ipreamble + ITA) \bmod Nresource$$

wherein, Iresource is an index of the first wireless resource in the J candidate wireless resources, Nresource=J is the quantity of the candidate wireless resources, Ipreamble represents an index of the first sequence, and ITA representative an index of the target time interval range in the P time interval ranges.

The present disclosure provides a method for wireless communication in a base station, comprising:
    receiving a first wireless signal; and
    receiving a second wireless signal;
    wherein the first wireless signal is generated by a first sequence; the first wireless signal is used to determine a first time interval; the first time interval is a time interval between a first time instant and a second time instant; the first time instant is a starting time instant at which a transmitter of the first wireless signal transmits the first wireless signal; the second time instant is a starting time instant at which a transmitter of the second wireless signal transmits the second wireless signal; the first time instant is earlier than the second time instant; the second wireless signal occupies a first wireless resource; the first wireless resource is one of J candidate wireless resources; the J is a positive integer; the first time interval is used to determine the first wireless resource out of the J candidate wireless resources.

In one embodiment of the method for wireless communication in a base station, the J candidate wireless resource(s) correspond(s) to P time interval range(s); any two time interval ranges of the P time interval ranges do not overlap; the P is a positive integer; the first time interval belongs to a target time interval range; the target time interval range is a time interval range of the P time interval ranges; the target time interval range corresponds to K candidate wireless resource(s) out of the J candidate wireless resources; the first wireless resource is one of the K candidate wireless resource(s); the K is a positive integer smaller than or equal to the J.

In one embodiment of the method for wireless communication in a base station, the method further comprises:
    transmitting a first signaling;
    wherein the first wireless signaling is used to determine Q wireless resource pool(s); the Q is a positive integer; each candidate wireless resource of the J candidate wireless resources belongs to one of the Q wireless resource pool(s).

In one embodiment of the method for wireless communication in a base station, the K candidate wireless resource(s) belongs (belong) to a first wireless resource pool the first wireless resource pool is one of the Q wireless resource pool(s); the first time interval is used to determine the first wireless resource pool out of the Q wireless resource pool(s).

In one embodiment of the method for wireless communication in a base station, the method further comprises:
 transmitting a second wireless signaling;
 wherein the second wireless signaling is used to determine the first time interval.

In one embodiment of the method for wireless communication in a base station, the first wireless signal is used to determine whether the second wireless signal is transmitted or not.

In one embodiment of the method for wireless communication in a base station, the first sequence belongs to a target sequence set; the first wireless signal occupies a target time-frequency resource; at least one of an index of the first sequence in the target sequence set, a location of the target time-frequency resource in time domain, a location of the target time-frequency resource in frequency domain, or a correspondence relationship between the location of the target time-frequency resource in time domain and the location of the target time-frequency resource in frequency domain is used to determine the first wireless resource out of the J candidate wireless resources.

The present disclosure provides a user equipment for wireless communication, comprising:
 a first processor transmitting a first wireless signal; and
 a first transmitter transmitting a second wireless signal;
 wherein the first wireless signal is generated by a first sequence; the first wireless signal is used to determine a first time interval; the first time interval is a time interval between a first time instant and a second time instant; the first time instant is a starting time instant at which a transmitter of the first wireless signal transmits the first wireless signal; the second time instant is a starting time instant at which a transmitter of the second wireless signal transmits the second wireless signal; the first time instant is earlier than the second time instant; the second wireless signal occupies a first wireless resource; the first wireless resource is one of J candidate wireless resources; the J is a positive integer; the first time interval is used to determine the first wireless resource out of the J candidate wireless resources.

In one embodiment of the user equipment for wireless communication, the J candidate wireless resource(s) correspond(s) to P time interval range(s); any two time interval ranges of the P time interval ranges do not overlap; the P is a positive integer; the first time interval belongs to a target time interval range; the target time interval range is a time interval range of the P time interval ranges; the target time interval range corresponds to K candidate wireless resource(s) out of the J candidate wireless resources; the first wireless resource is one of the K candidate wireless resource(s); the K is a positive integer smaller than or equal to the J.

In one embodiment of the user equipment for wireless communication, the first processor receives a first signaling; wherein the first wireless signaling is used to determine Q wireless resource pool(s); the Q is a positive integer; each candidate wireless resource of the J candidate wireless resources belongs to one of the Q wireless resource pool(s).

In one embodiment of the user equipment for wireless communication, the K candidate wireless resource(s) belongs (belong) to a first wireless resource pool the first wireless resource pool is one of the Q wireless resource pool(s); the first time interval is used to determine the first wireless resource pool out of the Q wireless resource pool(s).

In one embodiment of the user equipment for wireless communication, the first processor further receives a second wireless signaling; wherein the second wireless signaling is used to determine the first time interval.

In one embodiment of the user equipment for wireless communication, the first wireless signal is used to determine whether the second wireless signal is transmitted or not.

In one embodiment of the user equipment for wireless communication, the first sequence belongs to a target sequence set; the first wireless signal occupies a target time-frequency resource; at least one of an index of the first sequence in the target sequence set, a location of the target time-frequency resource in time domain, a location of the target time-frequency resource in frequency domain, or a correspondence relationship between the location of the target time-frequency resource in time domain and the location of the target time-frequency resource in frequency domain is used to determine the first wireless resource out of the J candidate wireless resources.

The present disclosure provides a base station for wireless communication, comprising:
 a second processor transmitting a first wireless signal; and
 a first receiver transmitting a second wireless signal;
 wherein the first wireless signal is generated by a first sequence; the first wireless signal is used to determine a first time interval; the first time interval is a time interval between a first time instant and a second time instant; the first time instant is a starting time instant at which a transmitter of the first wireless signal transmits the first wireless signal; the second time instant is a starting time instant at which a transmitter of the second wireless signal transmits the second wireless signal; the first time instant is earlier than the second time instant; the second wireless signal occupies a first wireless resource; the first wireless resource is one of J candidate wireless resources; the J is a positive integer; the first time interval is used to determine the first wireless resource out of the J candidate wireless resources.

In one embodiment of the base station for wireless communication, the J candidate wireless resource(s) correspond(s) to P time interval range(s); any two time interval ranges of the P time interval ranges do not overlap; the P is a positive integer; the first time interval belongs to a target time interval range; the target time interval range is a time interval range of the P time interval ranges; the target time interval range corresponds to K candidate wireless resource(s) out of the J candidate wireless resources; the first wireless resource is one of the K candidate wireless resource(s); the K is a positive integer smaller than or equal to the J.

In one embodiment of the base station for wireless communication, the second processor transmits a first signaling; wherein the first wireless signaling is used to determine Q wireless resource pool(s); the Q is a positive integer; each candidate wireless resource of the J candidate wireless resources belongs to one of the Q wireless resource pool(s).

In one embodiment of the base station for wireless communication, the K candidate wireless resource(s) belongs (belong) to a first wireless resource pool the first wireless resource pool is one of the Q wireless resource pool(s); the first time interval is used to determine the first wireless resource pool out of the Q wireless resource pool(s).

In one embodiment of the base station for wireless communication, the second processor further transmits a second wireless signaling; wherein the second wireless signaling is used to determine the first time interval.

In one embodiment of the base station for wireless communication, the first wireless signal is used to determine whether the second wireless signal is transmitted or not.

In one embodiment of the base station for wireless communication, the first sequence belongs to a target sequence set; the first wireless signal occupies a target time-frequency resource; at least one of an index of the first sequence in the target sequence set, a location of the target time-frequency resource in time domain, a location of the target time-frequency resource in frequency domain, or a correspondence relationship between the location of the target time-frequency resource in time domain and the location of the target time-frequency resource in frequency domain is used to determine the first wireless resource out of the J candidate wireless resources.

Compared with the prior art, the present disclosure has the following technical advantages.

In the case of a preamble transmission collision, it is possible that the base station side can still correctly receive and decode the uplink data, thereby improving the capacity of the entire system.

The ambiguity of uplink transmission between multiple uplink receiving nodes is avoided, thereby improving link performance, reducing false alarm probability, and reducing receiver complexity.

BRIEF DESCRIPTION OF THE DRAWINGS

Other features, objects, and advantages of the present disclosure will become more apparent from the detailed description of the accompanying drawings.

DESCRIPTION OF THE EMBODIMENTS

The technical solutions of the present disclosure will be further described in detail below with reference to the accompanying drawings. It should be noted that the features of the embodiments and the embodiments of the present disclosure may be combined with each other without conflict.

Embodiment 1

Figure 1:
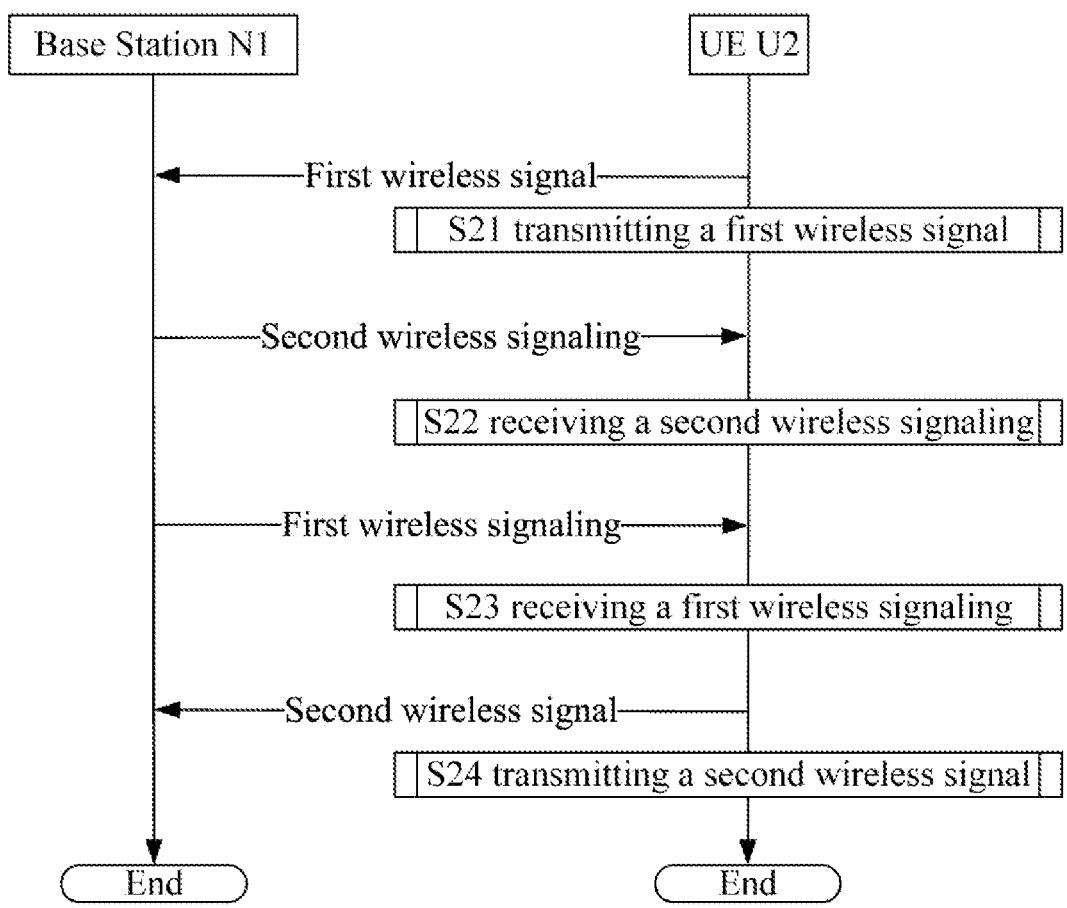
FIG. 1 shows a wireless signal transmission flow diagram according to one embodiment of the present disclosure.

Embodiment 1 shows a wireless signal transmission flow diagram, as shown in FIG. 1. In FIG. 1, the base station N1 is a maintenance base station of the serving cell of the UE U2.

For the base station N1, the first wireless signal is received in Step S11, the second wireless signaling is transmitted in Step S12, the first wireless signaling is transmitted in Step S13, and the second wireless signal is received in Step S14.

For UE U2, the first wireless signal is transmitted in Step S21, the second wireless signaling is received in Step S22, the first wireless signaling is received in Step S23, and the second wireless signal is transmitted in Step S24.

In Embodiment 1, the first wireless signal is generated by a first sequence; the first wireless signal is used to determine a first time interval by the base station N1; the first time interval is a time interval between a first time instant and a second time instant; the first time instant is a starting time instant at which a transmitter of the first wireless signal transmits the first wireless signal; the second time instant is a starting time instant at which a transmitter of the second wireless signal transmits the second wireless signal; the first time instant is earlier than the second time instant. The second wireless signal occupies a first wireless resource; the first wireless resource is one of J candidate wireless resources; the J is a positive integer; the first time interval is used to determine the first wireless resource out of the J candidate wireless resources by the base station N1 and UE U2. The first wireless signaling is used to determine Q wireless resource pool(s) by UE U2; the Q is a positive integer. The second wireless signaling is used to determine the first time interval by UE U2.

In one embodiment, the J candidate wireless resources correspond to P time interval ranges; any two time interval ranges of the P time interval ranges do not overlap; the P is a positive integer. The first time interval belongs to a target time interval range; the target time interval range is a time interval range of the P time interval ranges; the target time interval range corresponds to K candidate wireless resource(s) out of the J candidate wireless resources; the first wireless resource is one of the K candidate wireless resource(s); the K is a positive integer smaller than or equal to the J.

In one embodiment, each candidate wireless resource of the J candidate wireless resources belongs to one of the Q wireless resource pool(s).

In one embodiment, each candidate wireless resource of the J candidate wireless resources belongs to one of the Q wireless resource pool(s). The K candidate wireless resource(s) belongs (belong) to a first wireless resource pool the first wireless resource pool is one of the Q wireless resource pool(s); the first time interval is used to determine the first wireless resource pool out of the Q wireless resource pool(s).

In one embodiment, the first wireless signal is used to determine whether the second wireless signal is transmitted or not.

In one embodiment, the first sequence belongs to a target sequence set; the first wireless signal occupies a target time-frequency resource; at least one of an index of the first sequence in the target sequence set, a location of the target time-frequency resource in time domain, a location of the target time-frequency resource in frequency domain, or a correspondence relationship between the location of the target time-frequency resource in time domain and the location of the target time-frequency resource in frequency domain is used to determine the first wireless resource out of the J candidate wireless resources.

In one embodiment, the first time interval is determined by the base station N1 performing correlation on the first wireless signal.

In one embodiment, the first time interval determines the first wireless resource in the J candidate wireless resources by using a pre-determined mapping relationship.

In one embodiment, the first wireless signaling explicitly indicates the Q wireless resource pool(s).

In one embodiment, the first wireless signaling is a high layer signaling.

In one embodiment, the first wireless signaling is a physical layer signaling.

In one embodiment, the first wireless signaling is a Wireless Resource Control (RRC) signaling.

In one embodiment, the first wireless signaling is cell-specific signaling.

In one embodiment, the first wireless signaling is UE-specific signaling.

In one embodiment, the second wireless signaling indicates a portion of the first time interval.

In one embodiment, the first time interval is equal to a sum of a known time interval and an offset value. The offset value is positive; or the offset value is negative. The second wireless signaling indicates the offset value.

In one embodiment, the second wireless signaling explicitly indicates the first time interval.

In one embodiment, the second wireless signaling is a Medium Access Control (MAC) signaling.

In one embodiment, the second wireless signaling is a Radio Resource Control (RRC) signaling.

Embodiment 2

Figure 2:
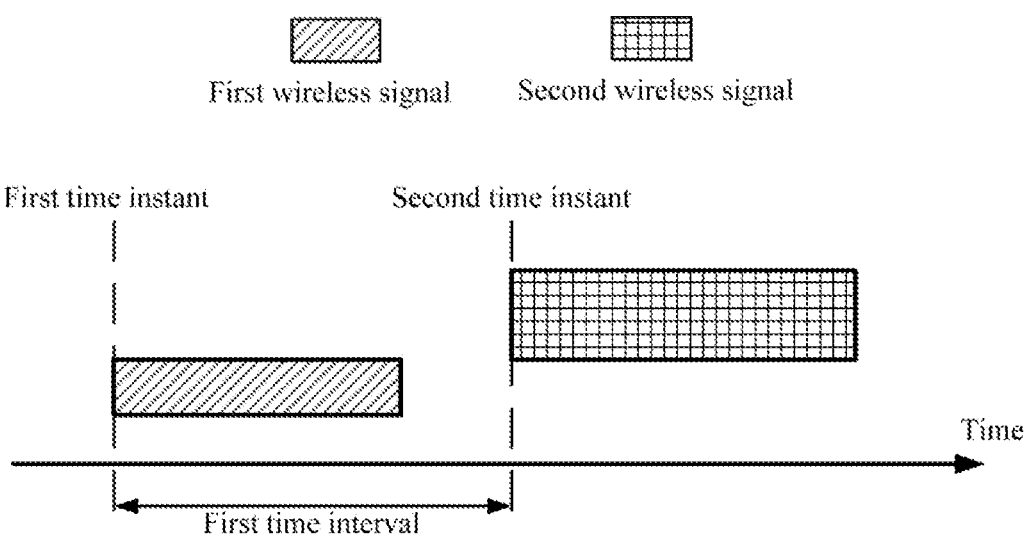
FIG. 2 is a schematic diagram showing a relationship between a first wireless signal and a second wireless signal according to one embodiment of the present disclosure.

Embodiment 2 shows relationship between a first wireless signal and a second wireless signal, as shown in FIG. 2. In FIG. 2, the horizontal axis represents time, the rectangle filled by slashes represents the first wireless signal, and the rectangle filled by cross-lines represents the second wireless signal.

In Embodiment 2, the first wireless signal is generated by a first sequence; the first wireless signal is used to determine a first time interval; the first time interval is a time interval between a first time instant and a second time instant; the first time instant is a starting time instant at which a transmitter of the first wireless signal transmits the first wireless signal; the second time instant is a starting time instant at which a transmitter of the second wireless signal transmits the second wireless signal; the first time instant is earlier than the second time instant.

In one embodiment, the transmission channel corresponding to the first wireless signal is a Random Access Channel (RACH).

In one embodiment, the transmission channel corresponding to the first wireless signal is a Physical Random Access Channel (PRACH).

In one embodiment, the transmission channel corresponding to the first wireless signal is a Narrow band Physical Random Access Channel (NPRACH).

In one embodiment, the first wireless signal is a signal generated based on a preamble sequence.

In one embodiment, a transmission channel corresponding to the second wireless signal is an Uplink Shared Channel (UL-SCH).

In one embodiment, a physical channel corresponding to the second wireless signal is a Physical Uplink Shared Channel (PUSCH).

In one embodiment, a physical channel corresponding to the second wireless signal is a Narrow band Physical Uplink Shared Channel (NPUSCH).

In one embodiment, the second wireless signal carries Scheduling Request (SR) information.

In one embodiment, the receiver of the first wireless signal and the receiver of the second wireless signal are the same.

In one embodiment, the receiver of the first wireless signal and the receiver of the second wireless signal are different.

Embodiment 3

Figure 3:
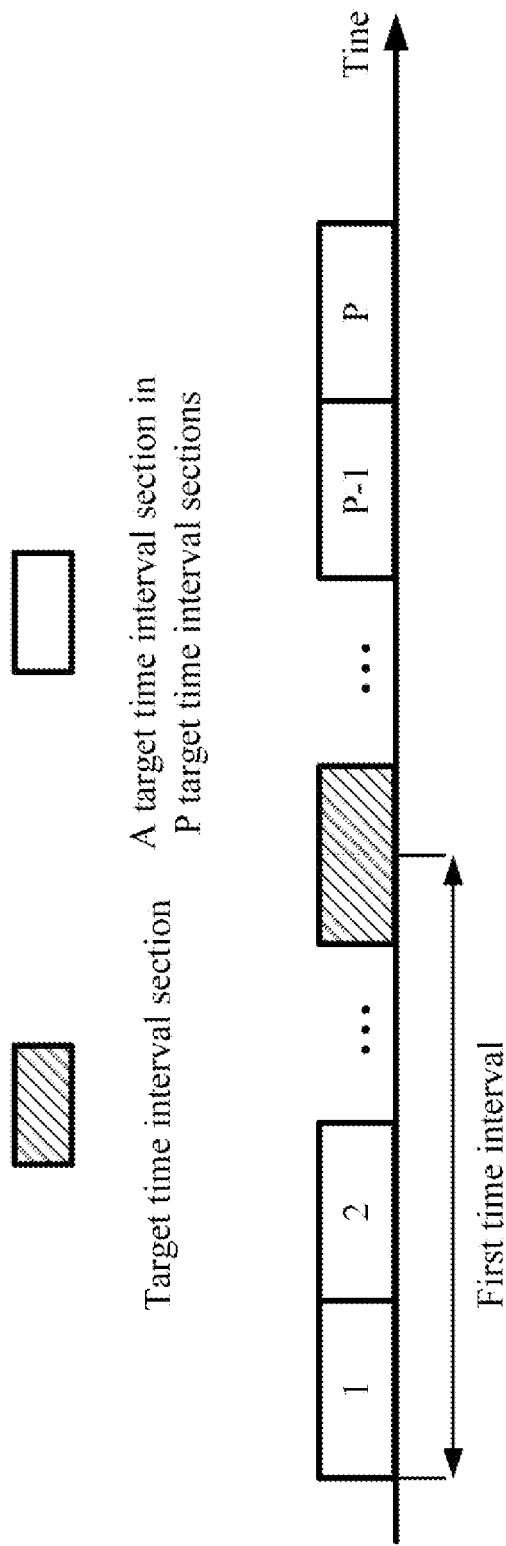
FIG. 3 is a schematic diagram showing a relationship between a first time interval and a target time interval according to one embodiment of the present disclosure.

Embodiment 3 illustrates a relationship between the first time interval and the target time interval, as shown in FIG. 3. In FIG. 3, the horizontal axis represents time, the unfilled rectangle represents one time interval range in P time interval ranges, and the rectangle filled by slashes represents the target interval range.

In Embodiment 3, any two time interval ranges of the P time interval ranges do not overlap; the P is a positive integer. The first time interval belongs to a target time interval range; the target time interval range is a time interval range of the P time interval ranges.

In one embodiment, one time interval range refers to a continuous range of one time interval.

In one embodiment, the phrase that any two time interval ranges of the P time interval ranges do not overlap refers to no time interval belongs to two the time interval ranges.

In one embodiment, the interval lengths of any two time interval ranges of the P time interval ranges are the same.

In one embodiment, the interval lengths of two time interval ranges of the P time interval ranges are different.

In one embodiment, the P is equal to 2.

In one embodiment, the P is a positive integer greater than 2.

In one embodiment, the P is predefined.

In one embodiment, the P is configured through a network.

In one embodiment, the first time interval is a positive number.

In one embodiment, the first time interval is a negative number.

In one embodiment, the first time interval comprises a difference between a positive integer number of Orthogonal Frequency Division Multiplexing (OFDM) symbols and a Timing Advance (TA).

Embodiment 4

Figure 4:
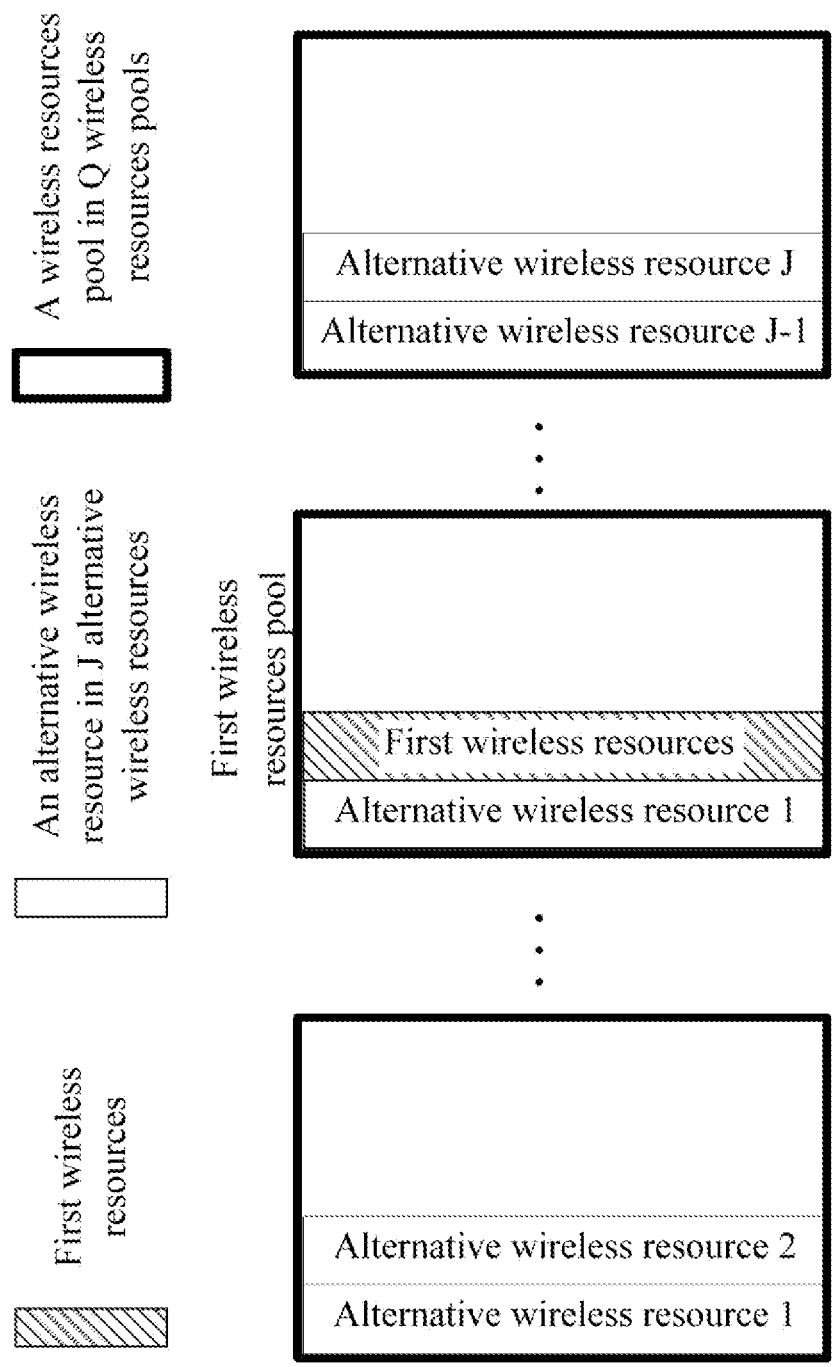
FIG. 4 is a schematic diagram showing a relationship between a first wireless resource and a first wireless resource pool according to one embodiment of the present disclosure.

Embodiment 4 illustrates a relationship between a first wireless resource and a first wireless resource pool, as shown in FIG. 4. In FIG. 4, the thick-line rectangle represents one wireless resource pool of the Q wireless resource pool(s), the thin-line rectangle represents one alternative wireless resource of the J alternative wireless resources, and the thin-line rectangle filled by slashes represents the first wireless resource.

In Embodiment 4, each candidate wireless resource of the J candidate wireless resources belongs to one of the Q wireless resource pool(s); the first wireless resource is one of J candidate wireless resources; the J is a positive integer; the first wireless resource pool is one of the Q wireless resource pool(s); the first wireless resource belongs to the first wireless resource pool.

In one embodiment, the wireless resource pool includes a positive integer number of Physical Resource Blocks (PRB) in frequency domain.

In one embodiment, the wireless resource pool includes a positive integer number of Resource Block Groups (RBG) in frequency domain.

In one embodiment, the numbers of the wireless resource elements in any two wireless resource pools of the Q wireless resource pools are the same.

In one embodiment, the numbers of the wireless resource elements in two wireless resource pools of the Q wireless resource pools are different.

In one embodiment, the J is greater than the Q.

In one embodiment, the J is less than the Q.

In one embodiment, the J is equal to the Q.

In one embodiment, the J is equal to the Q, and the J candidate wireless resources belong to the Q wireless resource pools.

In one embodiment, the J is equal to the Q, and the J candidate wireless resources belong to the Q wireless resource pools. The J candidate wireless resources are the Q wireless resource pools.

Embodiment 5

Figure 5:
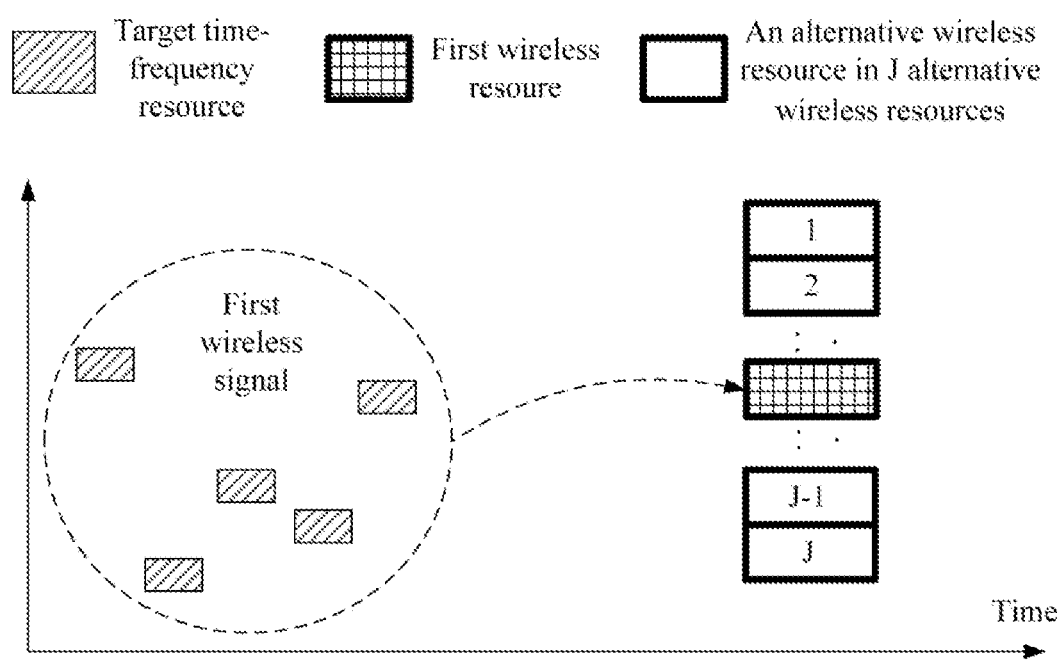
FIG. 5 is a schematic diagram showing a relationship between a first wireless signal and a first wireless resource according to one embodiment of the present disclosure.

Embodiment 5 illustrates a relationship between a first wireless signal and a first wireless resource, as shown in FIG. 5. In FIG. 5, the horizontal axis represents time and the vertical axis represents frequency, all the thin-line boxes filled with slashes constitute the target time-frequency resources, the unfilled thick-line box represents one of the J alternative wireless resources, and the thick-line box filled with cross lines represents the first wireless resource.

In Embodiment 5, the first wireless signal is generated by a first sequence, the second wireless signal occupies the first wireless resource; the first wireless resource is one of J candidate wireless resources; the J is a positive integer; the first wireless signal is used to determine whether the second wireless signal is transmitted or not. The first sequence belongs to a target sequence set; the first wireless signal occupies a target time-frequency resource; at least one of an index of the first sequence in the target sequence set, a location of the target time-frequency resource in time domain, a location of the target time-frequency resource in frequency domain, or a correspondence relationship between the location of the target time-frequency resource in time domain and the location of the target time-frequency resource in frequency domain is used to determine the first wireless resource out of the J candidate wireless resources.

In one embodiment, whether the second wireless signal is transmitted or not is determined by a base station performing correlation on the first wireless signal.

In one embodiment, when the associated peak of the first wireless signal after performing correlation exceeds a given threshold, the base station determines that the second wireless signal is transmitted.

In one embodiment, the target sequence set only includes the first sequence.

In one embodiment, the target sequence set includes the first sequence and a sequence other than the first sequence.

In one embodiment, any one of the target sequence sets is a ZC sequence.

In one embodiment, the target time-frequency resource is continuous in time domain.

In one embodiment, the target time-frequency resource is discrete in time domain.

In one embodiment, the target time-frequency resource is continuous in frequency domain.

In one embodiment, the target time-frequency resource is discrete in frequency domain.

In one embodiment, the target time-frequency resource is packet hopping in frequency domain.

In one embodiment, the target time-frequency resource is two-stage packet hopping in frequency domain.

In one embodiment, the index of the first sequence in the target sequence set is an index for which the sequences in the target sequence set are sorted by a specific order.

In one embodiment, the corresponding relationship between the location of the target time-frequency resource in time domain and the location of the target time-frequency resource in frequency domain refers to a frequency hopping pattern in the target time-frequency resource.

In one embodiment, at least one of an index of the first sequence in the target sequence set, a location of the target time-frequency resource in time domain, a location of the target time-frequency resource in frequency domain, or a correspondence relationship between the location of the target time-frequency resource in time domain and the location of the target time-frequency resource in frequency domain is used by the UE to determine the first wireless resource out of the J candidate wireless resources.

In one embodiment, at least one of an index of the first sequence in the target sequence set, a location of the target time-frequency resource in time domain, a location of the target time-frequency resource in frequency domain, or a correspondence relationship between the location of the target time-frequency resource in time domain and the location of the target time-frequency resource in frequency domain is used by the base station to determine the first wireless resource out of the J candidate wireless resources.

In one embodiment, at least one of an index of the first sequence in the target sequence set, a location of the target time-frequency resource in time domain, a location of the target time-frequency resource in frequency domain, or a correspondence relationship between the location of the target time-frequency resource in time domain and the location of the target time-frequency resource in frequency domain is used to determine the first wireless resource out of the J candidate wireless resources through a pre-determined mapping relationship In one embodiment, the first wireless resource is determined by using the following formula in the J candidate wireless resources:

$$I_{resource} = (I_{preamble} + \mathit{ITA}) \bmod N_{resource}$$

wherein, Iresource is an index of the first wireless resource in the J candidate wireless resources, Nresource=J is the quantity of the candidate wireless resources, Ipreamble represents an index of the first sequence, and ITA representative an index of the target time interval range in the P time interval ranges.

Embodiment 6

Figure 6:
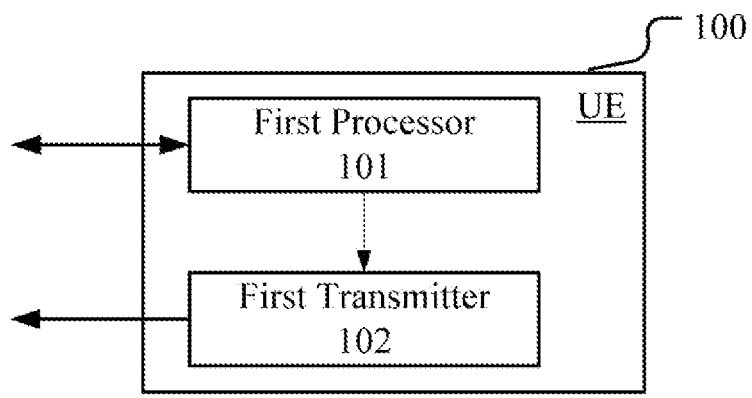
FIG. 6 is a block diagram showing the structure of a processing device in a user equipment (UE) according to one embodiment of the present disclosure.

Embodiment 6 illustrates a block diagram showing the structure of a processing device in a user equipment (UE), as shown in FIG. 6. In FIG. 6, the user equipment processor 100 includes a first processor 101 and a first transmitter 102. The first processor 101 includes the transmitter/receiver 1156 (including the antenna 1160), the receiving processor 1152, the transmitting processor 1155 and the controller/processor 1190 in FIG. 11 of the present disclosure; the first transmitter 102 includes the transmitter/receiver 1156 (including the antenna 1160), the transmit processor 1155 and the controller/processor 1190 in FIG. 11 of the present disclosure are included.

In Embodiment 6, the first processor 101 transmits a first wireless signal and the first transmitter 102 transmits a second wireless signal. The first wireless signal is generated by a first sequence; the first wireless signal is used to determine a first time interval; the first time interval is a time interval between a first time instant and a second time instant; the first time instant is a starting time instant at which a transmitter of the first wireless signal transmits the first wireless signal; the second time instant is a starting time instant at which a transmitter of the second wireless signal transmits the second wireless signal; the first time instant is earlier than the second time instant. The second wireless signal occupies a first wireless resource; the first wireless resource is one of J candidate wireless resources; the J is a positive integer; the first time interval is used determine the first wireless resource out of the J candidate wireless resources. The first processor 101 further receives a first wireless signaling and a second wireless signaling.

In one embodiment, the J candidate wireless resources correspond to P time interval ranges; any two time interval ranges of the P time interval ranges do not overlap; the P is a positive integer. The first time interval belongs to a target time interval range; the target time interval range is a time interval range of the P time interval ranges; the target time interval range corresponds to K candidate wireless resource(s) out of the J candidate wireless resources; the first wireless resource is one of the K candidate wireless resource(s); the K is a positive integer smaller than or equal to the J.

In one embodiment, the first wireless signaling is used to determine Q wireless resource pool(s); the Q is a positive integer; each candidate wireless resource of the J candidate wireless resources belongs to one of the Q wireless resource pool(s).

In one embodiment, the first wireless signaling is used to determine Q wireless resource pool(s); the Q is a positive integer; each candidate wireless resource of the J candidate wireless resources belongs to one of the Q wireless resource pool(s). The K candidate wireless resource(s) belongs (belong) to a first wireless resource pool the first wireless resource pool is one of the Q wireless resource pool(s); the first time interval is used to determine the first wireless resource pool out of the Q wireless resource pool(s).

In one embodiment, the second wireless signaling is used to determine the first time interval.

In one embodiment, the first wireless signal is used to determine whether the second wireless signal is transmitted or not.

In one embodiment, the first sequence belongs to a target sequence set; the first wireless signal occupies a target time-frequency resource; at least one of an index of the first sequence in the target sequence set, a location of the target time-frequency resource in time domain, a location of the target time-frequency resource in frequency domain, or a correspondence relationship between the location of the target time-frequency resource in time domain and the location of the target time-frequency resource in frequency domain is used to determine the first wireless resource out of the J candidate wireless resources.

Embodiment 7

Figure 7:
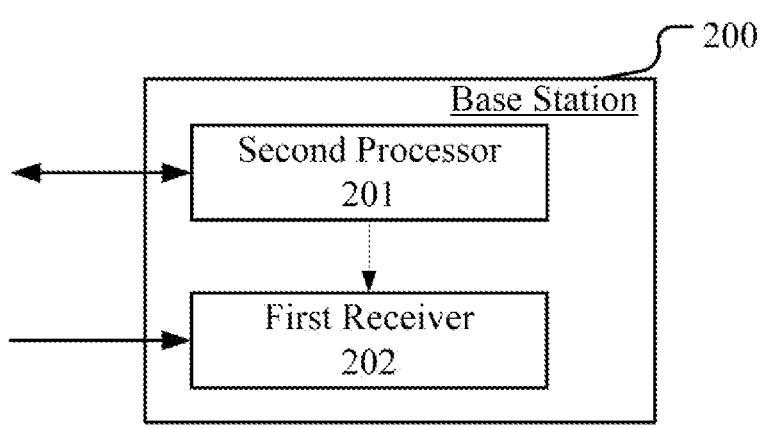
FIG. 7 is a block diagram showing the structure of a processing device in a base station according to one embodiment of the present disclosure.

Embodiment 7 illustrates a block diagram showing the structure of a processing device in a base station, as shown in FIG. 7. In FIG. 7, The base station processing device 200 includes a second processor 201 and a first receiver 202. The second processor 201 includes the transmitter/receiver 1116 (including the antenna 1120), the transmitting processor 1115, the receiving processor 1112 and the controller/processor 1140 in FIG. 11 of the present disclosure; The first receiver 202 includes the transmitter/receiver 1116 (including the antenna 1120), the receiving processor 1112 and the controller/processor 1140 in the FIG. 11 of the present disclosure.

In Embodiment, the second processor 201 receives the first wireless signal and the first receiver 202 receives the second wireless signal. The first wireless signal is generated by a first sequence; the first wireless signal is used to determine a first time interval; the first time interval is a time interval between a first time instant and a second time instant; the first time instant is a starting time instant at which a transmitter of the first wireless signal transmits the first wireless signal; the second time instant is a starting time instant at which a transmitter of the second wireless signal transmits the second wireless signal; the first time instant is earlier than the second time instant. The second wireless signal occupies a first wireless resource; the first wireless resource is one of J candidate wireless resources; the J is a positive integer; the first time interval is used determine the first wireless resource out of the J candidate wireless resources. The second processor 201 further transmits the first wireless signaling and the second wireless signaling.

In one embodiment, the J candidate wireless resources correspond to P time interval ranges; any two time interval ranges of the P time interval ranges do not overlap; the P is a positive integer greater than 1. The first time interval belongs to a target time interval range; the target time interval range is a time interval range of the P time interval ranges; the target time interval range corresponds to K candidate wireless resource(s) out of the J candidate wireless resources; the first wireless resource is one of the K candidate wireless resource(s); the K is a positive integer smaller than or equal to the J.

In one embodiment, the second processor receives a first signaling; wherein the first wireless signaling is used to determine Q wireless resource pool(s); the Q is a positive integer; each candidate wireless resource of the J candidate wireless resources belongs to one of the Q wireless resource pool(s).

In one embodiment, the second processor receives a first signaling; wherein the first wireless signaling is used to determine Q wireless resource pool(s); the Q is a positive integer; each candidate wireless resource of the J candidate wireless resources belongs to one of the Q wireless resource pool(s). The K candidate wireless resource(s) belongs (belong) to a first wireless resource pool the first wireless resource pool is one of the Q wireless resource pool(s); the first time interval is used to determine the first wireless resource pool out of the Q wireless resource pool(s).

In one embodiment, the second wireless signaling is used to determine the first time interval.

In one embodiment, the first wireless signal is used to determine whether the second wireless signal is transmitted or not.

In one embodiment, the first sequence belongs to a target sequence set; the first wireless signal occupies a target time-frequency resource; at least one of an index of the first sequence in the target sequence set, a location of the target time-frequency resource in time domain, a location of the target time-frequency resource in frequency domain, or a correspondence relationship between the location of the target time-frequency resource in time domain and the location of the target time-frequency resource in frequency domain is used to determine the first wireless resource out of the J candidate wireless resources.

Embodiment 8

Figure 8:
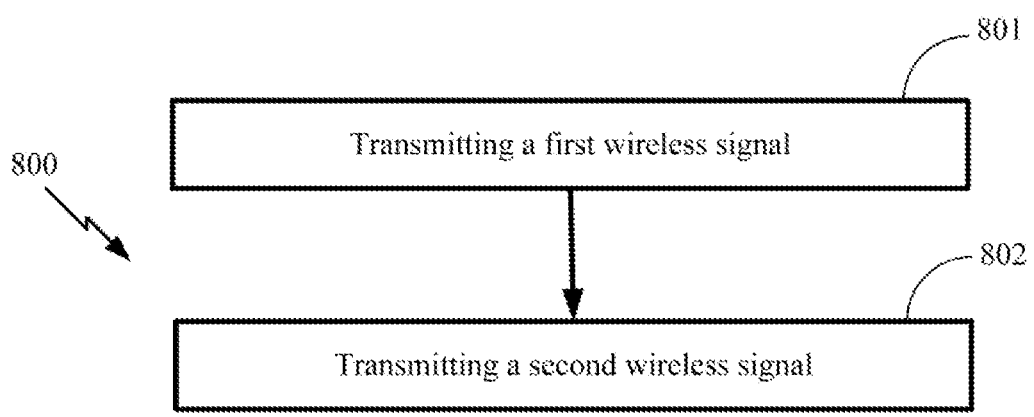
FIG. 8 shows a flow chart of first information, second information and a first signal according to one embodiment of the present disclosure.

Embodiment 8 illustrates a flow chart of first information, second information and first signal according to one embodiment of the present disclosure, as shown in FIG. 8. In FIG. 8, each block represents a step, and it is particularly emphasized that the order of the various blocks in the figure does not represent a temporal relationship between the steps shown.

In Embodiment 8, the user equipment in this disclosure transmits a first wireless signal in Step 801, and transmits a second wireless signal in Step 802, wherein the first wireless signal is generated by a first sequence; the first wireless signal is used to determine a first time interval; the first time interval is a time interval between a first time instant and a second time instant; the first time instant is a starting time instant at which a transmitter of the first wireless signal transmits the first wireless signal; the second time instant is a starting time instant at which a transmitter of the second wireless signal transmits the second wireless signal; the first time instant is earlier than the second time instant; the second wireless signal occupies a first wireless resource; the first wireless resource is one of J candidate wireless resources; the J is a positive integer; the first time interval is used determine the first wireless resource out of the J candidate wireless resources.

Embodiment 9

Figure 9:
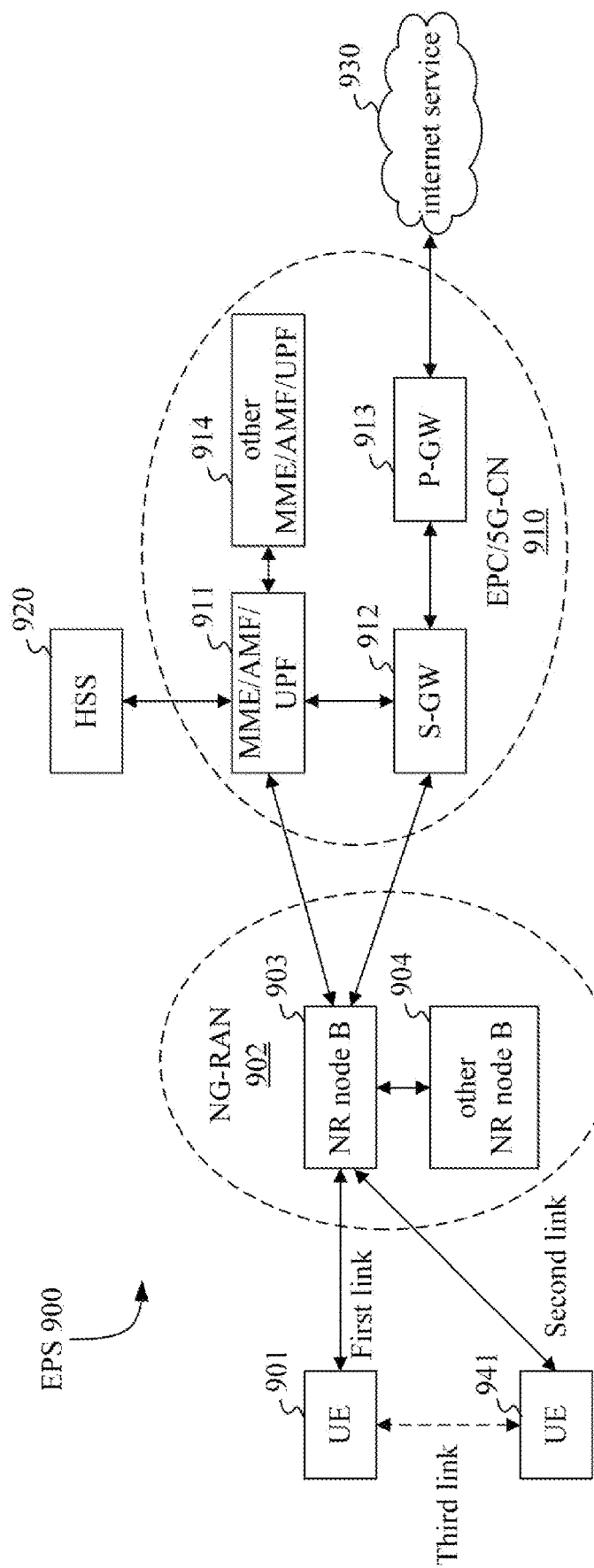
FIG. 9 shows a schematic diagram of a network architecture according to one embodiment of the present disclosure.

Embodiment 9 illustrates a schematic diagram of a network architecture according to one embodiment of the present disclosure, as shown in FIG. 9. FIG. 9 illustrates a network structure 900 of NR 5G, long-term evolution (LTE) and long-term evolution advanced (LTE-A) systems. The network architecture 900 of NR 5G or LTE may be referred to as an evolve packet system (EPS) 900. The EPS 900 may include one or more UEs 901, an NG-RAN 902, an Evolved Packet Core (EPC)/5G-Core Network (5G-CN) 910, a home subscriber server (HSS) 920 and an internet service 930. The EPS 900 may be interconnected with other access networks, but for the sake of simplicity, these entities/interfaces are not shown. As shown in the figure, the EPS provides packet switching services. Those skilled in the art would readily appreciate that the various concepts presented throughout this disclosure can be extended to networks or other cellular networks that provide circuit switching services. The NG-RAN comprises an NR Node B (gNB) 903 and other gNBs 904. The gNB 903 provides user and control plane protocol terminations for the UE 901. The gNB 903 can be connected to other gNBs 904 via an Xn interface (e.g., a backhaul). The gNB 903 may also be referred to as a base station, a base transceiver station, a wireless base station, a wireless transceiver, a transceiver function, a basic service set (BSS), an extended service set (ESS), a transmission and reception point (TRP), or some other suitable terminology. In an NTN network, the gNB 903 may be a satellite or a terrestrial base station relayed by satellite. The gNB 903 provides the UE901 with an access point to the EPC/5G-CN 910. In the embodiment, the UE901 comprises cellular telephones, smart phones, Session Initiation Protocol (SIP) phones, laptop computers, personal digital assistants (PDAs), satellite wireless, non-ground base station communications, satellite mobile communications, global positioning systems (GPSs), multimedia devices, video devices, digital audio player (e.g. MP3 players), cameras, game consoles, drones, aircrafts, narrowband physical network devices, machine type communication devices, land vehicles, automobiles, wearable devices, or any other devices having similar functionality. A person skilled in the art may also refer to UE 901 as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, remote terminal, handset, user agent, mobile client, client or some other suitable term. The gNB 903 is connected to the EPC/5G-CN 910 through an S1/NG interface. The EPC/5G-CN 910 comprises an MME/AMF/UPF 911, other MMEs/AMFs/UPFs 914, a Service Gateway (S-GW) 912 and a Packet Date Network Gateway (P-GW) 913. The MME/AMF/UPF 911 is a control node that handles a signaling between the UE 901 and the EPC/5G-CN 910. In general, the MME/AMF/UPF 911 provides bearer and connection management. All User Internet Protocol (IP) packets are transmitted through the S-GW 912, and the S-GW 912 itself is connected to the P-GW 913. The P-GW 913 provides UE IP address allocation as well as other functions. The P-GW 913 is connected to the internet service 930. The internet service 930 includes an operator-compatible internet protocol service, and may specifically include the Internet, an intranet, an IP Multimedia Subsystem (IMS), and a PS streaming service (PSS).

In one embodiment, the UE 901 corresponds to the user equipment in the present disclosure.

In one embodiment, the UE 901 supports Grant-free transmission.

In one embodiment, the gNB 903 corresponds to the base station in the present disclosure.

In one embodiment, the gNB 903 supports Grant-free transmission.

Embodiment 10

Figure 10:
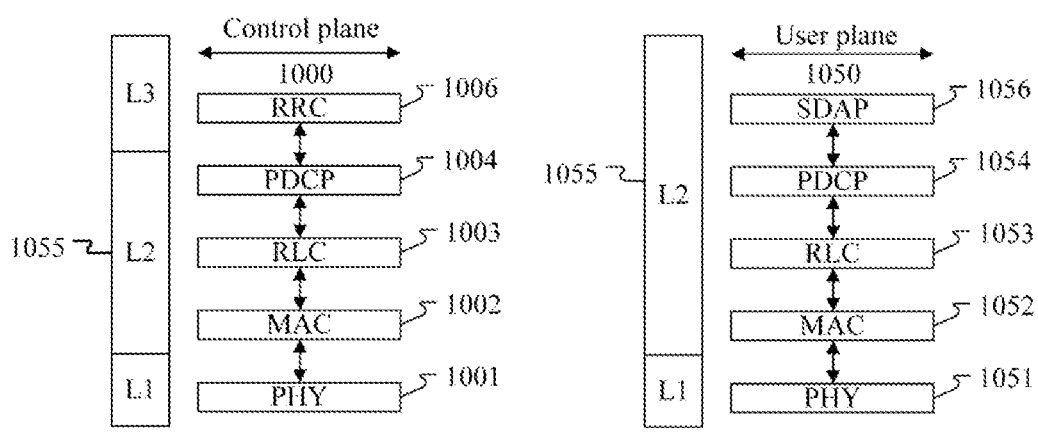
FIG. 10 is a schematic diagram showing a wireless protocol architecture of a user plane and a control plane according to one embodiment of the present disclosure.

Embodiment 10 illustrates a schematic diagram showing a wireless protocol architecture of a user plane and a control plane according to one embodiment of the present disclosure, as shown in FIG. 10. FIG. 10 illustrates the embodiment of the wireless protocol architecture for the user plane 1050 and the control plane 1000. FIG. 10 illustrates a wireless protocol architecture for the UE (UE, gNB or satellite or aircraft in NTN) and the base station equipment (gNB, UE, or satellite or aircraft in NTN), or for the control plane 1000 between two UEs in three layers: layer 1, layer 2 and layer 3. The Layer 1 (L1 layer) is the lowest layer and implements various signal processing functions of the physical layer. The L1 layer will be referred to herein as PHY 1001. The Layer 2 (L2 layer) 1005 is above PHY 1001 and is responsible for the link between the UE and the gNB through PHY 1001. L2 layer 1005 comprises a media access control (MAC) sub-layer 1002, a wireless link control (RLC) sub-layer 1003 and a packet data convergence protocol (PDCP) sub-layer 1004, and these sub-layers terminate at the base station. The PDCP sub-layer 1004 provides multiplexing between different wireless bearers and logical channels. The PDCP sublayer 1004 also provides security by encrypting a packet, and provides mobile support for UE handover between base station devices. The RLC sublayer 1003 provides segmentation and reassembling of an upper layer data packet, retransmission of a lost packets and reordering of a packet to compensate for the disordered reception resulted from the hybrid automatic repeat request (HARQ). The MAC sublayer 1002 provides multiplexing between a logical channel and a transport channel. The MAC sublayer 1002 is also responsible for allocating various wireless resources (i.e., resource blocks) in one cell between UEs. The MAC sublayer 1002 is also responsible for HARQ operation. The Wireless Resource Control (RRC) sublayer 1006 in Layer 3 (L3 layer) in the control plane 1000 is responsible for obtaining wireless resources (i.e. wireless bearers) and configuring the lower layer using an RRC signaling between the base station and the UE. The wireless protocol architecture of the user plane 1050 includes Layer 1 (L1 layer) and Layer 2 (L2 layer). For the physical layer 1051, the PDCP sublayer 1054 in L2 layer 1055, the RLC sublayer 1053 in L2 layer 1055 and the MAC sublayer 1052 in L2 layer 1055, the wireless protocol architecture for the user equipment and the base station in the user plane 1050 is substantially the same as that of the corresponding layers and sub-layers in the control plane 1000. However, the PDCP sublayer 1054 also provides header compression for upper layer data packets to reduce wireless transmission overhead. The L2 layer 1055 in the user plane 1050 further includes a Service Data Adaptation Protocol (SDAP) sublayer 1056. The SDAP sublayer 1056 is responsible for mapping between QoS streams and Data Wireless Bearers (DRBs) to support the diversity of services. Although not shown, the user equipment may have several upper layers above the L2 layer 1055, including a network layer (e.g., an IP layer) terminated at the P-GW on the network side and an application layer (e.g., the remote UE, server, etc.) terminated at the other end of the connection.

In one embodiment, the wireless protocol architecture of FIG. 10 is applicable to the user equipment in this disclosure.

In one embodiment, the wireless protocol architecture of FIG. 10 is applicable to the base station in this disclosure.

In one embodiment, the first wireless signal in the present disclosure is generated in the RRC sublayer 1006.

In one embodiment, the first wireless signal in the present disclosure is generated in the MAC sublayer 1002 or the MAC sublayer 1052.

In one embodiment, the first wireless signal in the present disclosure is generated in the PHY 1001 or PHY1051.

In one embodiment, the second wireless signal in the present disclosure is generated in the RRC sublayer 1006.

In one embodiment, the second wireless signal in the present disclosure is generated in the MAC sublayer 1002 or the MAC sublayer 1052.

In one embodiment, the second wireless signal in the present disclosure is generated in the PHY 1001 or PHY1051.

In one embodiment, the first wireless signaling in the present disclosure is generated in the RRC sublayer 1006.

In one embodiment, the first wireless signaling in the present disclosure is generated in the MAC sublayer 1002 or MAC sublayer 1052.

In one embodiment, the first wireless signaling in the present disclosure is generated in the PHY 1001 or PHY1051.

In one embodiment, the second wireless signaling in the present disclosure is generated in the RRC sublayer 1006.

In one embodiment, the second wireless signaling in the present disclosure is generated in the MAC sublayer 1002 or MAC sublayer 1052.

In one embodiment, the second wireless signaling in the present disclosure is generated in the PHY 1001 or PHY1051.

Embodiment 11

Figure 11:
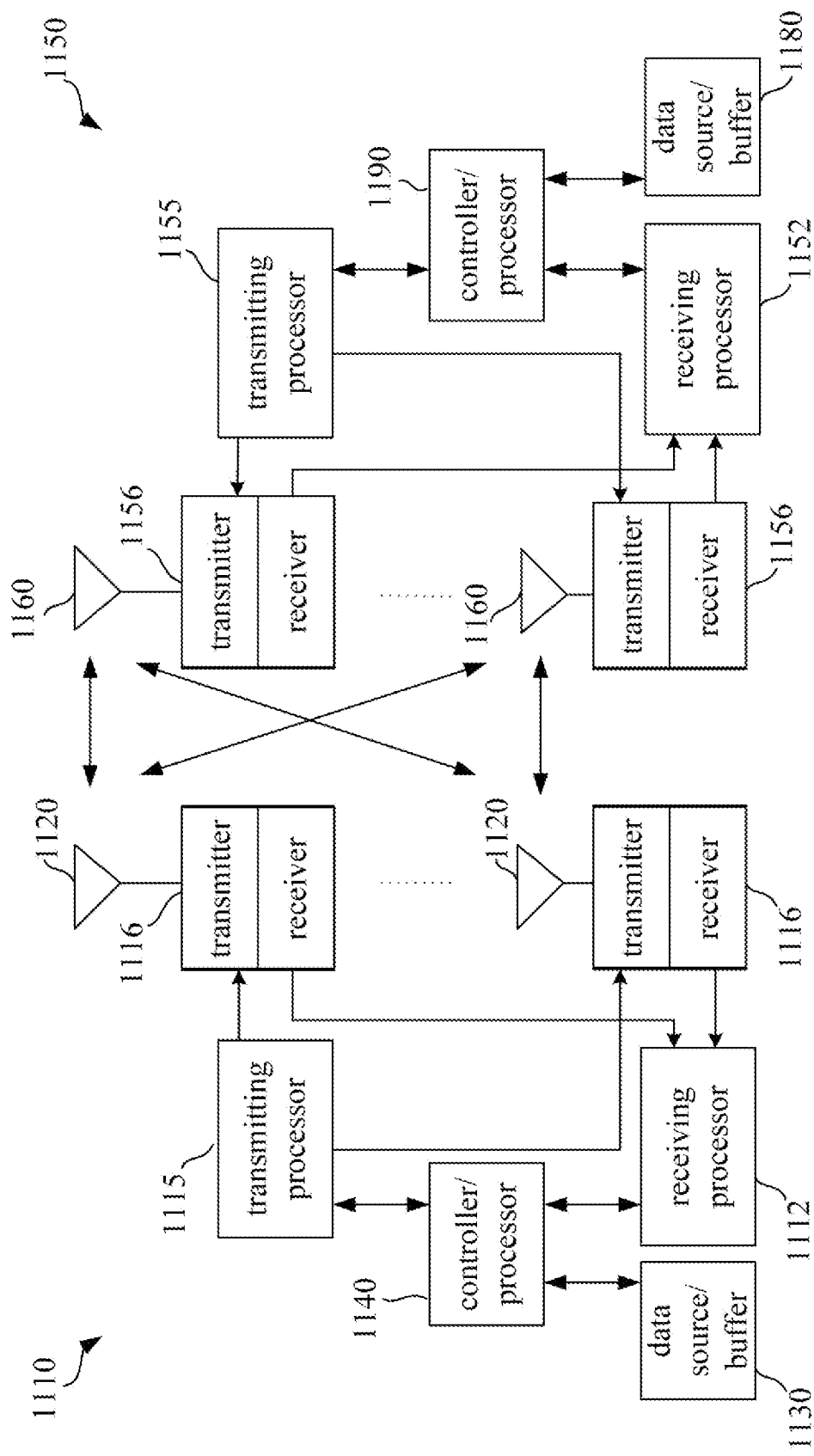
FIG. 11 shows a schematic diagram of a first communication node and a second communication node in according to one embodiment of the present disclosure.

Embodiment 11 illustrates a schematic diagram of a first communication node and a second communication node in according to one embodiment of the present disclosure, as shown in FIG. 11.

The user equipment (1150) comprises a controller/processor 1190, a data source/buffer 1180, a receiving processor 1152, a receiver/transmitter 1156, a transmitting processor 1155. The receiver/transmitter 1156 comprises an antenna 1160. The source/buffer 1180 provides an upper layer packet to the controller/processor 1190. The controller/processor 1190 provides header compression, encryption and decryption, packet segmentation and reordering, and multiplexing between logical and transport channels to implement L2 layer protocols and the upper layer protocols for the user plane and the control plane. The upper layer packet may include data or control information, such as DL-SCH, UL-SCH, or SL-SCH. The transmitting processor 1155 implements various signal transmission processing functions for the L1 layer (i.e., the physical layer), including encoding, interleaving, scrambling, modulation, power control/allocation pre-coding, and generation of physical layer control signaling. The receiving processor 1152 implements various signal receiving processing functions for the L1 layer (i.e., the physical layer) including decoding, deinterleaving, descrambling, demodulation, de-precoding and physical layer control signaling extraction. The transmitter 1156 is configured to convert the baseband signal provided by the transmitting processor 1155 into a radio frequency signal and to transmit the radio frequency signal via the antenna 1160. The transmitter 1156 is configured to convert the radio frequency signal received through the antenna 1160 into a baseband signal and provide the baseband signal to the receiving processor 1152.

The base station (1110) comprises a controller/processor 1140, a data source/buffer 1130, a receiving processor 1112, a transmitter/receiver 1116, a transmitting processor 1115. The transmitter/receiver 1116 comprises an antenna 1120. The source/buffer 1130 provides an upper layer packet to the controller/processor 1130. The controller/processor 1140 provides header compression, encryption and decryption, packet segmentation and reordering, and multiplexing between logical and transport channels to implement L2 layer protocols for the user plane and the control plane. The upper layer packet may include data or control information, such as DL-SCH, UL-SCH, or SL-SCH. The transmitting processor 1115 implements various signal transmission processing functions for the L1 layer (i.e., the physical layer), including encoding, interleaving, scrambling, modulation, power control/allocation, pre-coding, and generation of physical layer control signaling. The receiving processor 1112 implements various signal receiving processing functions for the L1 layer (i.e., the physical layer) including decoding, deinterleaving, descrambling, demodulation, de-precoding and physical layer control signaling extraction. The transmitter 1116 is configured to convert the baseband signal provided by the transmitting processor 1115 into a radio frequency signal and to transmit the radio frequency signal via the antenna 11620. The transmitter 1116 is configured to convert the radio frequency signal received through the antenna 1120 into a baseband signal and provide the baseband signal to the receiving processor 1112.

In Downlink (DL) transmission, the upper layer packet, such as the higher layer information included in the first wireless signaling and the second wireless signaling in the present disclosure, is provided to the controller/processor 1140. The controller/processor 1140 implements the functions of the L2 layer and the upper layer. In DL, the controller/processor 1140 provides header compression, encryption, packet segmentation and reordering, multiplexing between logical and transport channels, and wireless resource allocation to the user equipment 1150 based on various priority metrics. The controller/processor 1140 is also responsible for HARQ operations, retransmission of lost packets, and signaling to the user equipment 1150. For example, the higher layer information (if included) included in the first wireless signaling and the second wireless signaling in the present disclosure are all generated in the controller/processor 1140. The transmitting processor 1115 implements various signal transmission processing functions for the L1 layer (i.e., the physical layer), including encoding, interleaving, scrambling, modulation, power control/allocation, pre-coding, and generation of physical layer control signaling. The generation of the physical layer signals of the first wireless signaling and the second wireless signaling in the present disclosure is completed by the transmitting processor 1115. The generated modulation symbols are divided into parallel streams and each stream is mapped to a corresponding multi-carrier subcarrier and/or multi-carrier symbol, which is then mapped by the transmitting processor 1115 via the transmitter 1116 to the antenna 1120 for transmission as a wireless frequency signal. At the receiving end, each receiver 1156 receives a radio frequency signal through the respective antenna 1160. Each receiver 1156 recovers the baseband information modulated onto the radio frequency carrier and provides the baseband information to the receive processor 1152. The receiving processor 1152 implements various signal receiving processing functions of the L1 layer. The signal receiving processing function includes but is not limited to receiving the physical layer signals of the first wireless signaling and the second wireless signaling in the present disclosure, and the like. Demodulation is performed based on various modulation schemes (e.g., Binary Phase Shift Keying (BPSK), Quadrature Phase Shift Keying (QPSK)) by multicarrier symbols in a multicarrier symbol stream, and then de-scrambling, decoding and de-interleaving is performed to recover data or control transmitted by the base station 1110 on the physical channel. Then data and control signals are then provided to controller/processor 1190. The controller/processor 1190 is responsible for the L2 layer and the upper layer. The controller/processor 1190 interprets the higher layer information (if higher layer information is included) included in the first wireless signaling and the second wireless signaling of the present disclosure. The controller/processor can be associated with a memory 1180 that stores program codes and data. Memory 1180 can be referred to as a computer readable medium.

In Uplink (UL) transmission, the data source/buffer 1180 provides upper layer data to the controller/processor 1190. The data source/buffer 1180 represents all protocol layers for the L2 layer and the upper layer. The controller/processor 1190 provides header compression, encryption, packet segmentation and reordering, and multiplexing between logical and transport channels to implement L2 layer protocols for the user plane and the control plane through the wireless resource allocation based on base station 1110. The controller/processor 1190 is also responsible for HARQ operations, retransmission of lost packets, and signaling to the base station 1110. The first wireless signal of the present disclosure is generated at the controller/processor 1190 and the second wireless signal is generated at the data source/buffer 1180. The transmitting processor 1155 implements various signal transmission processing functions for the L1 layer (i.e., the physical layer). The physical layer signal of the first wireless signal and the physical layer signal of the second wireless signal of the present disclosure are generated at the transmitting processor 1155. The signal transmission processing functions include encoding and interleaving to facilitate forward error correction (FEC) at the UE 1150 and to modulate the baseband signal based on various modulation schemes (e.g., binary phase shift keying (BPSK), quadrature phase shift keying (QPSK)). The modulation symbols are divided into parallel streams and each stream is mapped to a corresponding multi-carrier sub-carrier and/or multi-carrier symbol, which is then mapped by the transmitting processor 1155 via the transmitter 1156 to the antenna 1160 for transmission in the form of a wireless frequency signal. The receiver 1116 receives the radio frequency signal through the respective antenna 1120. Each receiver 1116 recovers the baseband information modulated onto the wireless frequency carrier and provides the baseband information to the receive processor 1112. The receiving processor 1112 implements various signal receiving processing functions for the L1 layer (i.e., the physical layer), including receiving the physical layer signals of the first wireless signal and the second wireless signal of the present disclosure. The signal reception processing function includes acquiring a multi-carrier symbol stream, and then performing demodulation for the multi-carrier symbols in the multi-carrier symbol stream based on various modulation schemes (for example, binary phase shift keying (BPSK), quadrature phase shift keying (QPSK)). The decoding and deinterleaving are then performed to recover the data and/or control signals originally transmitted by the user equipment 1150 on the physical channel. The data and/or control signals are then provided to controller/processor 1140. The function of the L2 layer is implemented at the controller/processor 1140, including the interpretation of the information carried by the first wireless signal and the second wireless signal of the present disclosure. The controller/processor can be associated with the buffer 1130 that stores program codes and data. The buffer 1130 can be a computer readable medium.

In one embodiment, the UE 1150 includes: at least one processor and at least one memory. The at least one memory includes a computer program code. The at least one memory and the computer program code are configured to use with the at least one processor together. The UE450 at least: transmits a first wireless signal; and transmits a second wireless signal; wherein the first wireless signal is generated by a first sequence; the first wireless signal is used to determine a first time interval; the first time interval is a time interval between a first time instant and a second time instant; the first time instant is a starting time instant at which a transmitter of the first wireless signal transmits the first wireless signal; the second time instant is a starting time instant at which a transmitter of the second wireless signal transmits the second wireless signal; the first time instant is earlier than the second time instant; the second wireless signal occupies a first wireless resource; the first wireless resource is one of J candidate wireless resource(s); the J is a positive integer; the first time interval is used determine the first wireless resource out of the J candidate wireless resources.

In one embodiment, the UE 1150 includes: a memory storing a computer readable instruction program that, when executed by at least one processor, performs operations. The operations include: transmitting a first wireless signal; and transmitting a second wireless signal; wherein the first wireless signal is generated by a first sequence; the first wireless signal is used to determine a first time interval; the first time interval is a time interval between a first time instant and a second time instant; the first time instant is a starting time instant at which a transmitter of the first wireless signal transmits the first wireless signal; the second time instant is a starting time instant at which a transmitter of the second wireless signal transmits the second wireless signal; the first time instant is earlier than the second time instant; the second wireless signal occupies a first wireless resource; the first wireless resource is one of J candidate wireless resource(s); the J is a positive integer; the first time interval is used determine the first wireless resource out of the J candidate wireless resources.

In one embodiment, the base station 1110 includes: at least one processor and at least one memory. The at least one memory includes a computer program code. The at least one memory and the computer program code are configured to use with the at least one processor together. The base station 1110 at least: receives a first wireless signal; and receives a second wireless signal; wherein the first wireless signal is generated by a first sequence; the first wireless signal is used to determine a first time interval; the first time interval is a time interval between a first time instant and a second time instant; the first time instant is a starting time instant at which a transmitter of the first wireless signal transmits the first wireless signal; the second time instant is a starting time instant at which a transmitter of the second wireless signal transmits the second wireless signal; the first time instant is earlier than the second time instant; the second wireless signal occupies a first wireless resource; the first wireless resource is one of J candidate wireless resource(s); the J is a positive integer; the first time interval is used determine the first wireless resource out of the J candidate wireless resources.

In one embodiment, the base station 1110 includes: a memory storing a computer readable instruction program that, when executed by at least one processor, performs operations. The operations include: receiving a first wireless signal; and receiving a second wireless signal; wherein the first wireless signal is generated by a first sequence; the first wireless signal is used to determine a first time interval; the first time interval is a time interval between a first time instant and a second time instant; the first time instant is a starting time instant at which a transmitter of the first wireless signal transmits the first wireless signal; the second time instant is a starting time instant at which a transmitter of the second wireless signal transmits the second wireless signal; the first time instant is earlier than the second time instant; the second wireless signal occupies a first wireless resource; the first wireless resource is one of J candidate wireless resource(s); the J is a positive integer; the first time interval is used determine the first wireless resource out of the J candidate wireless resources.

In one embodiment, the transmitter 1156 (including the antenna 1160), the transmit processor 1155 and the controller/processor 1190 are used to transmit the first wireless signal in the present disclosure.

In one embodiment, the transmitter 1156 (including the antenna 1160), the transmit processor 1155 and the controller/processor 1190 are used to transmit the second wireless signal in the present disclosure.

In one embodiment, the transmitter 1156 (including the antenna 1160), the transmit processor 1155 and the controller/processor 1190 are used to transmit the first wireless signaling in the present disclosure.

In one embodiment, the transmitter 1156 (including the antenna 1160), the transmit processor 1155 and the controller/processor 1190 are used to transmit the second wireless signaling in the present disclosure.

In one embodiment, the transmitter 1116 (including the antenna 1120), the transmit processor 1112 and the controller/processor 1140 are used to receive the first wireless signal in the present disclosure.

In one embodiment, the transmitter 1116 (including the antenna 1120), the transmit processor 1112 and the controller/processor 1140 are used to receive the second wireless signal in the present disclosure.

In one embodiment, the transmitter 1116 (including the antenna 1120), the transmit processor 1112 and the controller/processor 1140 are used to receive the first wireless signaling in the present disclosure.

In one embodiment, the transmitter 1116 (including the antenna 1120), the transmit processor 1112 and the controller/processor 1140 are used to receive the second wireless signaling in the present disclosure.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station in the present disclosure includes but is not limited to macro-cellular base stations, micro-cellular base stations, home base stations, relay base station, gNB (NR node B), Transmitter Receiver Point (TRP), and other wireless communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method for wireless communication in a user equipment (UE), comprising:
transmitting a first wireless signal; and
transmitting a second wireless signal;
wherein the first wireless signal is generated by a first sequence; the first wireless signal is used to determine a first time interval; the first time interval is a time interval between a first time instant and a second time instant; the first time instant is a starting time instant at which a transmitter of the first wireless signal transmits the first wireless signal; the second time instant is a starting time instant at which a transmitter of the second wireless signal transmits the second wireless signal; the first time instant is earlier than the second time instant; the second wireless signal occupies a first wireless resource; the first wireless resource is one of J candidate wireless resources; the J is a positive integer; the first time interval is used to determine the first wireless resource out of the J candidate wireless resources; the first sequence is a Zadoff-Chu (ZC) sequence, a transport channel corresponding to the first wireless signal is a Random Access Channel (RACH), a physical channel corresponding to the second wireless signal is a Physical Uplink Shared Channel (PUSCH); the first wireless signal is used to determine whether the second wireless signal is transmitted or not.

2. The method of claim 1, wherein the J candidate wireless resources correspond to P time interval ranges; any two time interval ranges of the P time interval ranges do not overlap; the P is a positive integer greater than 1; the first time interval belongs to a target time interval range; the target time interval range is a time interval range of the P time interval ranges; the target time interval range corresponds to K candidate wireless resource(s) out of the J candidate wireless resources; the first wireless resource is one of the K candidate wireless resource(s); the K is a positive integer smaller than or equal to the J; P is configured by network.

3. The method of claim 2, further comprising:
receiving a first signaling;
wherein the first wireless signaling is used to determine Q wireless resource pool(s); the Q is a positive integer; each candidate wireless resource of the J candidate wireless resources belongs to one of the Q wireless resource pool(s); the K candidate wireless resource(s) belongs (belong) to a first wireless resource pool; the first wireless resource pool is one of the Q wireless resource pool(s); the first time interval is used to determine the first wireless resource pool out of the Q wireless resource pool(s).

4. The method of claim 1, further comprising:
receiving a second wireless signaling;
wherein the second wireless signaling is used to determine the first time interval; the second wireless signaling indicates a portion of the first time interval, the second wireless signaling is a Radio Resource Control (RRC) signaling.

5. The method of claim 1, wherein the first sequence belongs to a target sequence set; the first wireless signal occupies a target time-frequency resource; at least one of an index of the first sequence in the target sequence set, a location of the target time-frequency resource in time domain, a location of the target time-frequency resource in frequency domain, or a correspondence relationship between the location of the target time-frequency resource in time domain and the location of the target time-frequency resource in frequency domain is used to determine the first wireless resource out of the J candidate wireless resources through a pre-defined mapping relationship; the index of the first sequence in the target sequence set is an index for which the sequence in the target sequence set are sorted by a specific order.

6. A method for wireless communication in a base station, comprising:
receiving a first wireless signal; and
receiving a second wireless signal;
wherein the first wireless signal is generated by a first sequence; the first wireless signal is used to determine a first time interval; the first time interval is a time interval between a first time instant and a second time instant; the first time instant is a starting time instant at which a transmitter of the first wireless signal transmits the first wireless signal; the second time instant is a starting time instant at which a transmitter of the second wireless signal transmits the second wireless signal; the first time instant is earlier than the second time instant; the second wireless signal occupies a first wireless resource; the first wireless resource is one of J candidate wireless resources; the J is a positive integer; the first time interval is used to determine the first wireless resource out of the J candidate wireless resources; the first sequence is a Zadoff-Chu (ZC) sequence, a transport channel corresponding to the first wireless signal is a Random Access Channel (RACH), a physical channel corresponding to the second wireless signal is a Physical Uplink Shared Channel (PUSCH); the first wireless signal is used to determine whether the second wireless signal is transmitted or not.

7. The method of claim 6, wherein the J candidate wireless resources correspond to P time interval ranges; any two time interval ranges of the P time interval ranges do not overlap; the P is a positive integer greater than 1; the first time interval belongs to a target time interval range; the target time interval range is a time interval range of the P time interval ranges; the target time interval range corresponds to K candidate wireless resource(s) out of the J candidate wireless resources; the first wireless resource is one of the K candidate wireless resource(s); the K is a positive integer smaller than or equal to the J; P is configured by network.

8. The method of claim 7, further comprising:
transmitting a first signaling;
wherein the first wireless signaling is used to determine Q wireless resource pool(s); the Q is a positive integer; each candidate wireless resource of the J candidate wireless resources belongs to one of the Q wireless resource pool(s); the K candidate wireless resource(s) belongs (belong) to a first wireless resource pool; the first wireless resource pool is one of the Q wireless resource pool(s); the first time interval is used to determine the first wireless resource pool out of the Q wireless resource pool(s).

9. The method of claim 6, further comprising:
transmitting a second wireless signaling;
wherein the second wireless signaling is used to determine the first time interval; the second wireless signaling indicates a portion of the first time interval, the second wireless signaling is a Radio Resource Control (RRC) signaling.

10. The method of claim 6, wherein the first sequence belongs to a target sequence set; the first wireless signal occupies a target time-frequency resource; at least one of an index of the first sequence in the target sequence set, a location of the target time-frequency resource in time domain, a location of the target time-frequency resource in frequency domain, or a correspondence relationship between the location of the target time-frequency resource in time domain and the location of the target time-frequency resource in frequency domain is used to determine the first wireless resource out of the J candidate wireless resources through a pre-defined mapping relationship; the index of the first sequence in the target sequence set is an index for which the sequence in the target sequence set are sorted by a specific order.

11. A user equipment for wireless communication, comprising:
a first processor transmitting a first wireless signal; and
a first transmitter transmitting a second wireless signal;
wherein the first wireless signal is generated by a first sequence; the first wireless signal is used to determine a first time interval; the first time interval is a time interval between a first time instant and a second time instant; the first time instant is a starting time instant at which a transmitter of the first wireless signal transmits the first wireless signal; the second time instant is a starting time instant at which a transmitter of the second wireless signal transmits the second wireless signal; the first time instant is earlier than the second time instant; the second wireless signal occupies a first wireless resource; the first wireless resource is one of J candidate wireless resources; the J is a positive integer; the first time interval is used to determine the first wireless resource out of the J candidate wireless resources; the first sequence is a Zadoff-Chu (ZC) sequence, a transport channel corresponding to the first wireless signal is a Random Access Channel (RACH), a physical channel corresponding to the second wireless signal is a Physical Uplink Shared Channel (PUSCH); the first wireless signal is used to determine whether the second wireless signal is transmitted or not.

12. The user equipment of claim 11, wherein the J candidate wireless resources correspond to P time interval ranges; any two time interval ranges of the P time interval ranges do not overlap; the P is a positive integer greater than 1; the first time interval belongs to a target time interval range; the target time interval range is a time interval range of the P time interval ranges; the target time interval range corresponds to K candidate wireless resource(s) out of the J candidate wireless resources; the first wireless resource is one of the K candidate wireless resource(s); the K is a positive integer smaller than or equal to the J; P is configured by network.

13. The user equipment of claim 12, wherein the first processor receives a first signaling; wherein the first wireless signaling is used to determine Q wireless resource pool(s); the Q is a positive integer; each candidate wireless resource of the J candidate wireless resources belongs to one of the Q wireless resource pool(s); the K candidate wireless resource(s) belongs (belong) to a first wireless resource pool; the first wireless resource pool is one of the Q wireless resource pool(s); the first time interval is used to determine the first wireless resource pool out of the Q wireless resource pool(s).

14. The user equipment of claim 11, wherein the first processor receives a second wireless signaling; wherein the second wireless signaling is used to determine the first time interval; the second wireless signaling indicates a portion of the first time interval, the second wireless signaling is a Radio Resource Control (RRC) signaling.

15. The user equipment of claim 11, wherein the first sequence belongs to a target sequence set; the first wireless signal occupies a target time-frequency resource; at least one of an index of the first sequence in the target sequence set, a location of the target time-frequency resource in time domain, a location of the target time-frequency resource in frequency domain, or a correspondence relationship between the location of the target time-frequency resource in time domain and the location of the target time-frequency resource in frequency domain is used to determine the first wireless resource out of the J candidate wireless resources through a pre-defined mapping relationship; the index of the first sequence in the target sequence set is an index for which the sequence in the target sequence set are sorted by a specific order.

16. A base station for wireless communication, comprising:
a second processor transmitting a first wireless signal; and
a first receiver transmitting a second wireless signal;
wherein the first wireless signal is generated by a first sequence; the first wireless signal is used to determine a first time interval; the first time interval is a time interval between a first time instant and a second time instant; the first time instant is a starting time instant at which a transmitter of the first wireless signal transmits the first wireless signal; the second time instant is a starting time instant at which a transmitter of the second wireless signal transmits the second wireless signal; the first time instant is earlier than the second time instant; the second wireless signal occupies a first wireless resource; the first wireless resource is one of J candidate wireless resources; the J is a positive integer; the first time interval is used to determine the first wireless resource out of the J candidate wireless resources; the first sequence is a Zadoff-Chu (ZC) sequence, a transport channel corresponding to the first wireless signal is a Random Access Channel (RACH), a physical channel corresponding to the second wireless signal is a Physical Uplink Shared Channel (PUSCH); the first wireless signal is used to determine whether the second wireless signal is transmitted or not.

17. The base station of claim 16, wherein the J candidate wireless resources correspond to P time interval ranges; any two time interval ranges of the P time interval ranges do not overlap; the P is a positive integer greater than 1; the first time interval belongs to a target time interval range; the target time interval range is a time interval range of the P time interval ranges; the target time interval range corresponds to K candidate wireless resource(s) out of the J candidate wireless resources; the first wireless resource is one of the K candidate wireless resource(s); the K is a positive integer smaller than or equal to the J; P is configured by network.

18. The base station of claim 17, wherein the second processor transmits a first signaling; wherein the first wireless signaling is used to determine Q wireless resource pool(s); the Q is a positive integer; each candidate wireless resource of the J candidate wireless resources belongs to one of the Q wireless resource pool(s); the K candidate wireless resource(s) belongs (belong) to a first wireless resource pool; the first wireless resource pool is one of the Q wireless resource pool(s); the first time interval is used to determine the first wireless resource pool out of the Q wireless resource pool(s).

19. The base station of claim 16, wherein the second processor transmits a second wireless signaling; wherein the second wireless signaling is used to determine the first time interval; the second wireless signaling indicates a portion of the first time interval, the second wireless signaling is a Radio Resource Control (RRC) signaling.

20. The base station of claim 16, wherein the first sequence belongs to a target sequence set; the first wireless signal occupies a target time-frequency resource; at least one of an index of the first sequence in the target sequence set, a location of the target time-frequency resource in time domain, a location of the target time-frequency resource in frequency domain, or a correspondence relationship between the location of the target time-frequency resource in time domain and the location of the target time-frequency resource in frequency domain is used to determine the first wireless resource out of the J candidate wireless resources through a pre-defined mapping relationship; the index of the first sequence in the target sequence set is an index for which the sequence in the target sequence set are sorted by a specific order.

\* \* \* \* \*